(12) United States Patent
Perri et al.

(10) Patent No.: US 11,302,346 B2
(45) Date of Patent: Apr. 12, 2022

(54) SYSTEM AND METHOD FOR FRUSTRATION DETECTION

(71) Applicant: Nice Ltd., Ra'anana (IL)

(72) Inventors: Jessica Perri, Salt Lake City, UT (US); Amelie Stephan, Cupertino, CA (US); Julia Laski, Aurora, IL (US); Mark Schmelzenbach, Layton, UT (US); Sara Olson, Salt Lake City, UT (US); Shaun Matthews, Salt Lake City, UT (US)

(73) Assignee: NICE LTD., Ra'anana (IL)

( * ) Notice: Subject to any disclaimer, the term of this patent is extended or adjusted under 35 U.S.C. 154(b) by 140 days.

(21) Appl. No.: 16/776,601

(22) Filed: Jan. 30, 2020

(65) Prior Publication Data

US 2020/0294528 A1    Sep. 17, 2020

Related U.S. Application Data

(60) Provisional application No. 62/816,459, filed on Mar. 11, 2019.

(51) Int. Cl.

| | |
|---|---|
| *G10L 25/63* | (2013.01) |
| *G10L 15/06* | (2013.01) |
| *G10L 15/183* | (2013.01) |
| *G10L 15/22* | (2006.01) |
| *G06N 20/00* | (2019.01) |

(52) U.S. Cl.
CPC ............ *G10L 25/63* (2013.01); *G10L 15/063* (2013.01); *G10L 15/183* (2013.01); *G10L 15/22* (2013.01); *G06N 20/00* (2019.01)

(58) Field of Classification Search
CPC ..................................................... G06F 40/30
See application file for complete search history.

(56) References Cited

U.S. PATENT DOCUMENTS

| | | | | |
|---|---|---|---|---|
| 2002/0138338 | A1* | 9/2002 | Trauth | G06Q 10/06311 705/7.13 |
| 2005/0069122 | A1* | 3/2005 | Lin | H04M 3/5183 379/265.01 |
| 2006/0233347 | A1* | 10/2006 | Tong | G10L 15/26 379/265.06 |
| 2011/0033036 | A1* | 2/2011 | Edwards | G06Q 30/02 379/265.09 |

(Continued)

*Primary Examiner* — Jialong He
(74) *Attorney, Agent, or Firm* — Pearl Cohen Zedek Latzer Baratz LLP

(57) ABSTRACT

A computer based system and method for automatically detecting frustration in an interaction, may include: identifying in the interaction using a set of linguistic rules, natural language patterns related to frustration, wherein the linguistic rules further define weights associated with the natural language patterns and rule metadata; reviewing the rule metadata associated with the identified natural language patterns to identify override attributes, wherein if the rule metadata does not include override attributes, then a frustration level in the interaction is determined based on the identified natural language patterns and weights associated with the identified natural language patterns; and if the rule metadata includes override attributes than the frustration level is determined based on the identified override attributes.

21 Claims, 12 Drawing Sheets

(56) References Cited

U.S. PATENT DOCUMENTS

| | | | | |
|---|---|---|---|---|
| 2011/0307258 A1* | 12/2011 | Liberman | ............... | G10L 15/26 704/251 |
| 2012/0144242 A1* | 6/2012 | Vichare | ............... | G06F 11/0751 714/39 |
| 2014/0188457 A1* | 7/2014 | Fink | ................ | G06F 40/30 704/9 |
| 2016/0042359 A1* | 2/2016 | Singh | ............... | G06F 40/58 704/2 |
| 2016/0240214 A1* | 8/2016 | Dimitriadis | ............ | G10L 17/04 |

* cited by examiner

SYSTEM AND METHOD FOR FRUSTRATION DETECTION

CROSS-REFERENCE TO RELATED APPLICATIONS

This Application claims the benefit of U.S. Provisional Application Ser. No. 62/816,459, filed Mar. 11, 2019, which is hereby incorporated by reference in its entirety.

FIELD OF THE INVENTION

The present invention relates generally to automatically detecting frustration in calls, based for example on linguistic rules and machine learning algorithms, for use for example in contact centers.

BACKGROUND OF THE INVENTION

To an extent, consumer dissatisfaction is expected and acceptable in some call center interactions. In many situations, consumers are dissatisfied when they contact a call center. Similarly, an agent would be expected to use some negative language in the course of an interaction. However, when dissatisfaction and heightened emotions exceed an accepted level, action is needed.

Currently, identifying interactions that exceed this level is performed manually, e.g., by human agents listening to or reviewing interactions and estimating dissatisfaction level. Identifying dissatisfaction manually may be time consuming, e.g., it may take a human agent over one minute to analyze each interaction. In addition, the definition of a dissatisfaction level may be subjective. Thus, different agents in the organization may categorize interactions differently, and the process as a whole may not be consistent and may have a low accuracy rate.

In addition, the number of interactions that are analyzed manually may be limited, due to personnel and budgetary limitations. Such minimal review cannot provide an accurate overview of agent, team, or overall call center performance. Furthermore, a manual approach does not allow the user to correlate these problematic interactions with other key performance indicators (KPIs) and insights such as average handle time, contact purpose, etc., across all interactions and agents in order to gain a comprehensive and actionable view of how customer frustration is triggered in the contact center. Unaddressed frustration on the part of a consumer or an agent may lead to loss of goodwill and churn, damaging companies' reputations and revenue.

Therefore, there is a need to allow automatic technological analysis of interactions for detecting complaints.

SUMMARY OF THE INVENTION

A computer-based system and method for automatically detecting frustration in an interaction may include identifying in the interaction, by a computer processor, using a set of linguistic rules, natural language patterns related to frustration, wherein the linguistic rules define weights associated with the natural language patterns and rule metadata; reviewing, by the computer processor, the rule metadata associated with the identified natural language patterns to identify override attributes, wherein if the rule metadata does not include override attributes, then a frustration level in the interaction is determined, by the computer processor, based on the identified natural language patterns and weights associated with the identified natural language patterns; and if the rule metadata includes override attributes than the frustration level is determined, by the computer processor, based on the identified override attributes.

According to embodiments of the invention, an override attribute may be selected from the list consisting of: set interaction to frustrated, and set interaction to non-frustrated, wherein: if the rule metadata associated with the identified natural language patterns includes a set interaction to non-frustrated override attribute then the frustration level is determined to be non-frustrated, otherwise if the rule metadata associated with the identified natural language patterns includes a set interaction to frustrated override attribute then the frustration level is determined to be frustrated, and otherwise the frustration level is determined based on the identified natural language patterns and the weights associated with the identified natural language patterns.

Embodiments of the invention may include obtaining a transcription of the interaction, wherein identifying natural language patterns in the interaction may include identifying linguistic rules matches in the transcription of the interaction.

Embodiments of the invention may include providing text offset information for each of the identified natural language patterns; and highlighting the identified natural language patterns in the transcription of the interaction.

According to embodiments of the invention, determining the level of frustration in the interaction based on the identified natural language patterns and the weights associated with the identified natural language patterns may include: calculating a frustration score indicative of the probability that the interaction contains frustration using a classifier; and determining that the interaction contains frustration if the frustration score exceeds a first threshold.

According to embodiments of the invention, determining whether the interaction contains frustration based on the identified natural language patterns and weights associated with the identified natural language patterns may include: prior to calculating the frustration score, nulling all the weights associated with the identified natural language patterns only if a number of the natural language patterns is below a second threshold, and none of the identified rules include an override handling attribute to increase the final frustration level.

According to embodiments of the invention, the classifier may include one of: a binomial logistic regression with sigmoid function; and multinomial logistic regression algorithm with softmax function.

Embodiments of the invention may include generating the set of linguistic rules by: obtaining a plurality of labeled interactions, wherein the label indicates a known level of frustration in each of the labeled interactions; obtaining identification of phrases associated with frustration that are present in the labeled interactions that are labeled as including frustration; obtaining a linguistic rule for each of the identified phrases; training a classifier to calculate a weight for each of the linguistic rules; performing error analysis to evaluate performance of each linguistic rule; adjusting the weights based on the error analysis; and associating metadata to each linguistic rule.

According to embodiments of the invention, the rule metadata may include at least one of: a language of the associated linguistic rule; a rule type, wherein the rule type includes at least one of:

FRUSTRATION: for indicating a standard frustration rule,

FRUSTRATION_A_PRIORI: an override attribute for indicating a rule requiring override handling, NEUTRALIZE: an override attribute for indicating a rule requiring override handling, NEGATION: a rule used by other frustration rules, that encodes environments for linguistic negation and INTENSIFIER: a rule used by other frustration rules, that encodes environments for linguistic boosting, rule group: for grouping morphologically and semantically related natural language patterns;

rule logic: the linguistic pattern expressing frustration, comprising at least one of: single tokens, phrases, token operators, proximity operators, and co-occurrence sets; and rule behavior: special handling for contextual features including negation signifiers and intensifiers.

Embodiments of the invention may include: dividing the interaction into segments; and providing a frustration level for each segment.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
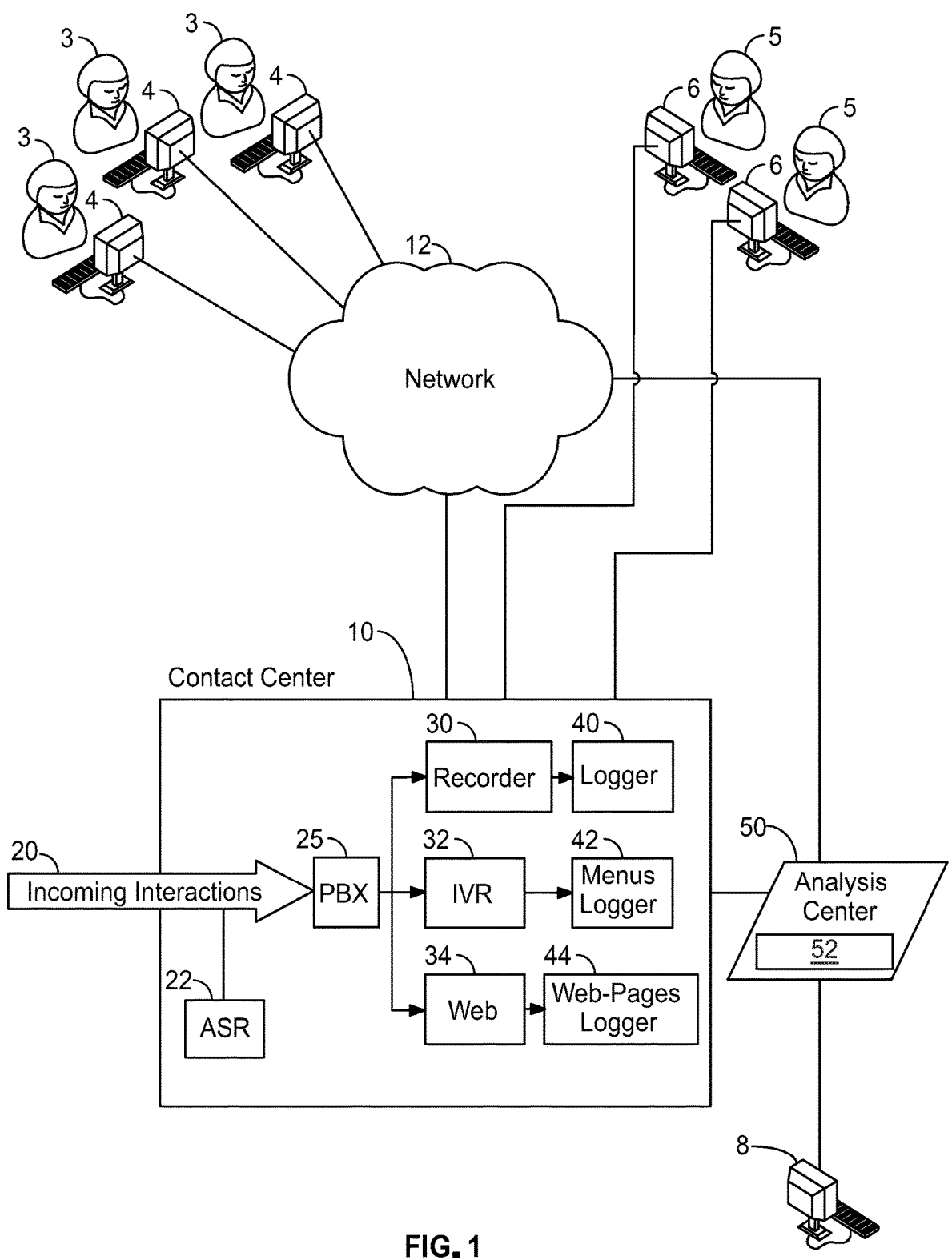
FIG. 1 is a block diagram of a system for detecting frustration in an interaction, according to embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Embodiments of the invention may include a computerized process receiving as input a large number of documents (e.g. transcripts or other derivations of interactions or contacts, which may be for example conversations), and may identify frustration cues in interactions by identifying in an interaction natural language patterns (e.g., a sequence of one or more tokens, also referred to herein as linguistic patterns and linguistic constructions) related to or indicating frustration. The natural language patterns may be defined using linguistic rules, that may further define weights associated with the natural language patterns, and rule metadata. Embodiments of the invention may determine a frustration level in the interaction using machine learning (ML) models based on the identified frustration cues and the weights associated with the identified frustration cues or based on overriding attributes that may be included in the metadata of some of the linguistic rules. As used herein a token may refer to a unit for processing. Most units may be single words, but a phrase may also be treated as a single unit for processing, e.g., 'customer_service' or 'customer_service_agent'.

Embodiments of the invention may provide an automated system and method for detecting frustration in interactions. Although a contact center may staff analysts or supervisors for detecting frustration in interactions, doing so may be relatively costly. For example, staffing more analysts or supervisors may increase the costs of operating the contact center, including salary costs with no increase in revenue. In addition, manual frustration detection may be highly subjective, as different analysts or supervisors in the organization may categorize interactions differently. Thus, manual categorization may not be consistent and may have a low accuracy rate. In contrast to manual categorization, the automated frustration detection according to embodiments of the invention may be consistent and may identify frustration at a higher level of precision and recall than can be done manually.

Furthermore, automated frustration detection may allow the user to correlate problematic interactions, e.g., interactions with high level of frustration, with other key performance indicators (KPIs) and insights such as average handle time, contact purpose, etc., across all interactions and agents in order to gain a comprehensive and actionable view of how customer frustration is triggered in the contact center. Identifying and addressing frustration on the part of a consumer or an agent may lead to preserving of goodwill and churn, and increasing companies' reputations and revenue.

A frustration metric, including for example frustration levels and scores, produced automatically according to embodiments of the invention may be used to provide a holistic view of the contact center by measuring the frustration of all customers across the contact center in aggregate, including during certain time ranges or certain communication channels. A user may use the frustration metric to review specific agents and their performance. A frustration metric may be used in conjunction with other analytic insights and KPIs in our product to: identify the agent behaviors most responsible for frustrating customers, understand which aspects of the business are responsible for this frustration (billing inquiries, account management, product issues, etc.), and identify specific customers that need special attention due to high frustration levels.

FIG. 1 is a block diagram of a system for detecting frustration in an interaction according to embodiments of the present invention. While FIG. 1 shows such a system in the context of a contact center, embodiments of the invention may be used in other contexts. Incoming interactions 20 (e.g. conversations, telephone calls, IVR interactions, etc.) among people 3 (e.g., customers) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate external user equipment 4 to communicate with agents 5 via contact center 10; and agents 5 may operate agent terminals 6 for that communication and other purposes. User terminals 8 may allow users, such as contact or data center personnel or agents, to run automatic frustration detection in interactions. Incoming interactions 20 may be pre-processed and may enter the system as text data, or may be converted to text via ASR module 22.

Figure 2:
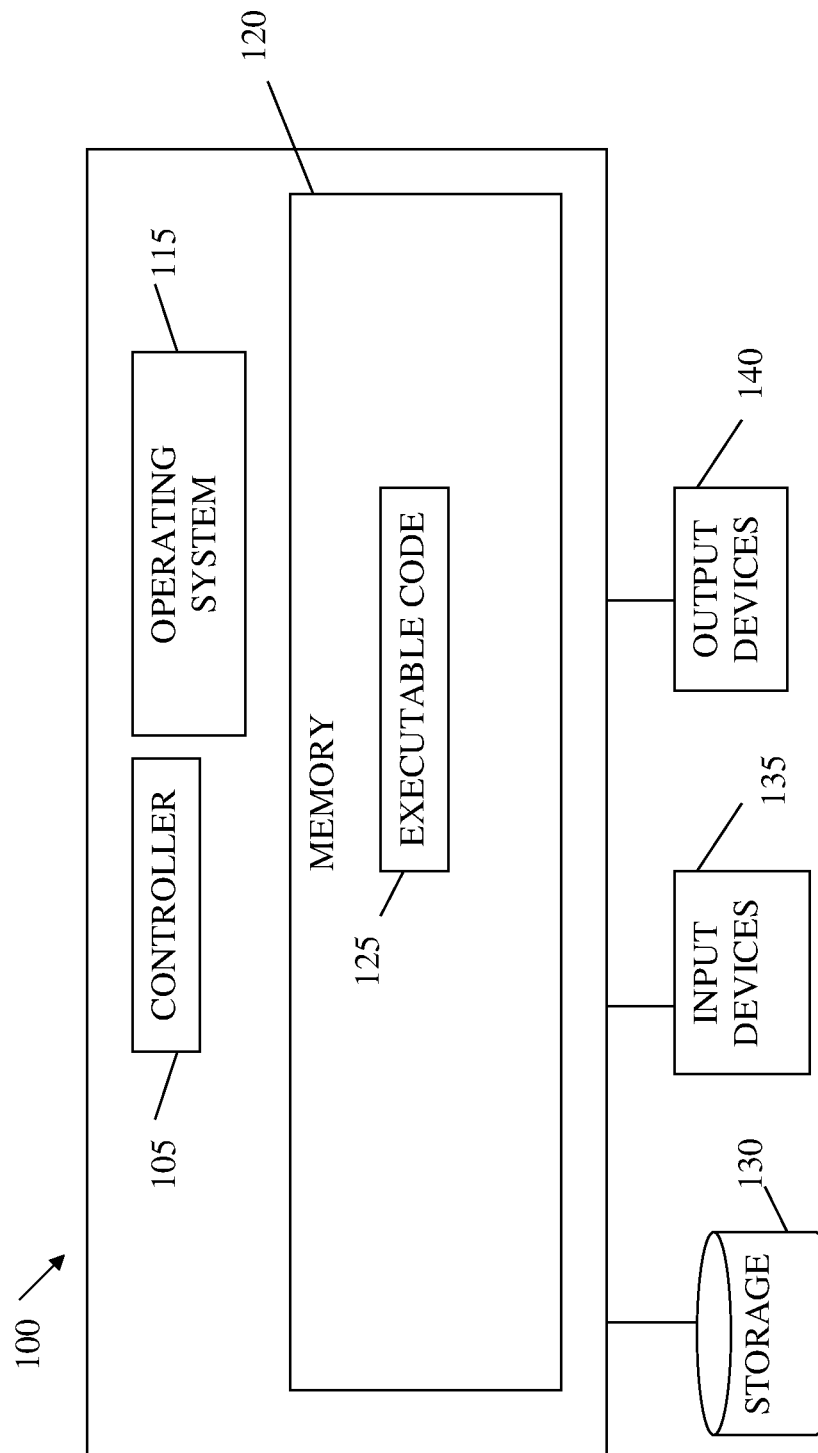
FIG. 2 is a high-level block diagram of an exemplary computing device which may be used with embodiments of the present invention.

User equipment 4, agent terminals 6 and user terminals 8 may include computing or telecommunications devices such as personal computers or other desktop computers, conventional telephones, cellular telephones, portable or tablet computers, smart or dumb terminals, etc., and may include some or all of the components such as a processor shown in FIG. 2.

Interaction data or documents may be stored, e.g., in files and/or databases. For example logger 40, menus logger 42, and web-page logger 44 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10.

Analysis center 50 may perform functions such as those shown in FIGS. 3-7, and may include for example frustration identification module 52 which may be or may be implemented as software code for detecting frustration in interactions as disclosed herein. For example, frustration identification module 52 may include a classifier such as a binary classifier and a ternary classifier for classifying interactions. Analysis center 50 may communicate with one or more user terminals 8 to for example provide visualizations.

One or more networks 12 may connect equipment or modules not physically co-located, for example connecting external user equipment 4 to contact center 10, and contact center 10 to analysis center 50. Networks 12 may include for example telephone networks, the Internet, or other networks. While in FIG. 1 contact center 10 is shown passing data to analysis center 50, these modules may communicate via a network such as networks 12.

Web block 34 may support web interactions over the Internet (e.g. operate web pages which may be executed in part on user equipment), IVR block 32 may provide menus and other information to customers and for obtaining selections and other information from customers, and recorder 34 may process or record voice sessions with customers. It may be appreciated that contact center 10 presented in FIG. 1 is not limiting and may include any blocks and infrastructure needed to handle voice, text (e.g., SMS (short message service), WhatsApp messages, chats, etc.) video and any type of interaction with costumers.

FIG. 2 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment such as contact center 10, ASR module 22 PBX 25, IVR block 32, voice interactions block or recorder 30, menus logger 42, connect API 34, analysis center 50, external user equipment 4, and agent terminals 6, user terminals 8 and other modules discussed herein may be or include a computing device such as included in FIG. 2, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as queries, documents, interactions, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 3-7 according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as documents or interactions may be stored in a storage 130 and may be loaded from storage 130 into a memory 120 where it may be processed by controller 105. In some embodiments, some of the components shown in FIG. 2 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 3:
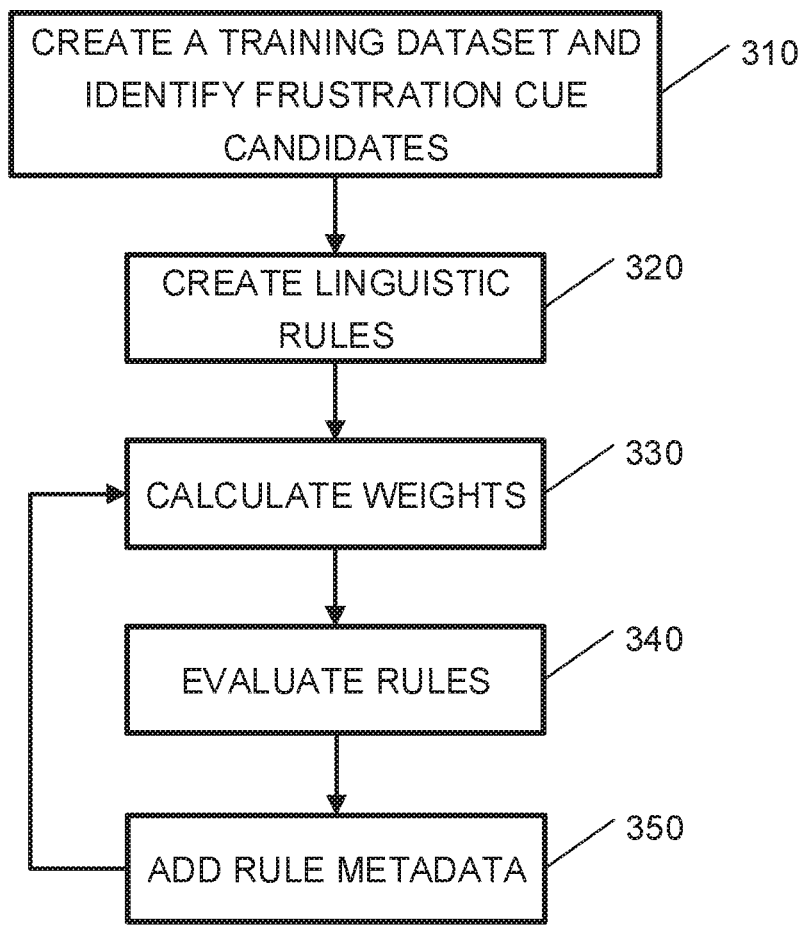
FIG. 3 is a flowchart of a method for generating linguistic rules for identifying natural language patterns related to frustration in interactions, according to embodiments of the present invention.

Reference is now made to FIG. 3 which is a flowchart of a method for generating linguistic rules for identifying natural language patterns related to or associated with frustration in interactions, according to embodiments of the present invention. While in some embodiments the operations of FIG. 3 are carried out using systems as shown in FIGS. 1 and 2, in other embodiments other systems and equipment can be used.

According to embodiments of the invention, linguistic rules may include or define frustration cues including natural language patterns or expressions related to or indicating frustration, weights indicating the significance or contribution of the associated frustration cue to the overall frustration level of the interaction, and metadata specifying special handling or overriding of the interaction frustration level. The weights may be calculated using ML techniques. These linguistic rules may be developed or generated through an iterative process of linguistic evaluation and ML techniques. When finalized, the linguistic rules may be deployed to incoming interactions to identify frustration cues in the interactions.

In operation 310, a training dataset may be created. The training dataset may include a subset of interactions selected e.g., by a human operator. The training dataset may include interactions that include frustration (or interactions that include various levels of frustration) and interactions that do not include frustration. The interactions in the subset that include frustration may be selected based on presence of natural language patterns or expressions related to frustration, also referred to herein as frustration cues. For example, a human operator may review interactions. If the human operator thinks that an interaction includes frustration cue candidates, he may add the interaction to the training dataset. The frustration cues may include one or more tokens, words or phrases that describe or are related to topics such as complaints about product quality, broken promises from call center agents, process inefficiencies, delays, extreme negative sentiment, and so forth. For example, frustration cues may include "frustrated", "been waiting", "confusing", "horrible", "terrible", "awful" etc. The frustration cues may be referred to at this stage as frustration cue candidates.

Each interaction from the training dataset may be evaluated e.g., by a human operator, to determine whether frustration is expressed in the interaction in any way. The linguistic source of the frustration is unimportant at this stage; the evaluation is only concerned with the presence or absence of frustration. A tag or a label, or a rating, may be assigned, e.g. by a human evaluator, to the interaction, the tag or label may represent the level of the frustration. For example, the tag or label may include a grade in a predetermined scale, indicating frustration intensity, or categorization of the interaction to frustration levels, e.g., high frustration, medium frustration, or none. It is noted that interactions may include some frustration cues and still be considered as not including frustration (or including low and acceptable levels of frustration). Thus, interactions that includes low levels of frustration (e.g., frustration level below a threshold) may be considered as interactions that do not include frustration. Some displeasure or frustration may be expected and acceptable in some call center interactions. For example, weaker cues such as "called three times" may be present in an interaction that does not include high or even medium level of frustration. The threshold for determining when an interaction includes no frustration (or low and acceptable level of frustration), medium or high frustration may be specific to an application or to an organization.

After the training dataset has been evaluated, a secondary automatic review of high frequency n-grams (e.g., expressions including n words or phrases, where n is an integer of for example 1 to 5) present in the interactions labeled as high and medium frustration (or having a frustration grade above a threshold) may be undertaken in order to identify additional frustration cue candidates. For example, if an n-gram that was not identified by the human operator as a frustration cue is found to be very frequent (e.g., appearing more than a number of times) in interactions that are labeled as including frustration, this expression or n-gram may be added to the frustration cue candidates. In some embodiments it may be checked that these high frequency n-grams are not as frequent in interactions that do not include frustration.

In operation 320, linguistic rules (also referred to as queries) may be created or generated. The linguistic rules may be created or generated, e.g., manually, for each of the frustration cue candidates identified in operation 310. In operation 330 rule parameters may be calculated for the linguistic rules generated in operation 320, for example by a classifier using the training dataset. The rule parameters may include some or all of weights, bias terms, means and standard deviations. Other rule parameters may be calculated. According to some embodiments, weights, bias terms, means and standard deviations may be calculated for each rule. According to some embodiments, weights bias terms, means and standard deviations may be calculated for each rule group. In some embodiments a binomial logistic regression may be used to calculate weights and bias terms for a binary frustration scale (e.g., frustrated or non-frustrated) and multinomial logistic regression may be used for a ternary scale (e.g., high frustration, medium frustration or none). For the purpose of calculating the weights and bias terms for the binary scale, the interactions labeled high frustration and medium frustration in the training dataset are simply treated as "frustrated." The binomial logistic regression or the multinomial logistic regression may be calculated, for example, using $\ell_2$ regularization with a SAGA solver such as the one provided by scikit-learn (a free software machine learning library for the Python programming language).

According to some embodiments, a threshold (e.g., a single threshold for binary classification and two thresholds for ternary classification, used for example in operation 550) may be calculated along with the weights in operation 330. In some embodiments, a default threshold of 0.5 may be used initially during training. ML model performance may be evaluated by calculating performance metrics, such as precision and recall, over some or all of the training set (e.g., utilizing a stratified k-fold cross-validation), while keeping the final weights and bias terms and only changing the threshold value. The threshold value may be adjusted to increase precision. Other methods for calculating the threshold may be used.

In operation 340, the performance of each of the linguistic rules may be benchmarked or evaluated over the training dataset through rigorous error analysis. The error analysis may include both statistical and/or manual error analysis. Example statistical measures include frequency tests (e.g., evaluating the frequency of different classes of errors in the data) and tests of independence with respect to other existing linguistic rules. Tests of independence may include statistical tests to evaluate whether a significant relationship exists between variables, to identify if errors (e.g., false positive and false negative for classes of documents or classes of frustration types in the training dataset when using the weights, bias terms and threshold calculated in operation 330) are specific to specific rules or rule groups. Manual error analysis may include manually grading linguistic rule matches with respect to intended linguistic constructions in order to calculate precision. For example, the precision of a linguistic rule may be calculated. The linguistic rules may be changed, e.g., manually, in response to the error analysis. For example, the logic of certain linguistic rules may be modified and/or certain rules may be removed from the linguistic model. Updated linguistic rules may then have their weights and other parameters updated by repeating operation 330.

In operation 350 rule metadata or rule attributes may be adjusted, added to or associated with the linguistic rules generated in operation 320. Thus, contextual features affecting the cues performance may be identified (automatically or manually by a human operator) and integrated as metadata into the rules (e.g., by changing the rule logic or rule behavior parameters disclosed herein). The process may be repeated, by returning to operation 330—parameters may be calculated for the adjusted rules, the adjusted rules may be evaluated, and so on. The process may be repeated until for example, performance metrics of the linguistic rule set also referred to herein as the linguistic model are high enough, according to the requirements of the specific application.

Linguistic rules with accepted performance characteristics (e.g., having precision or other metrices exceeding a threshold) may be included in the linguistic rule set or linguistic model, while linguistic rules with poor performance characteristics (e.g., having precision or other metrices not exceeding a threshold) may be excluded or removed from the linguistic rule set or linguistic model.

An example of a rule, including weights and metadata or attributes is provided hereinbelow. A subset or all of the metadata items defined hereinbelow, as well as other metadata items may be used. A linguistic rule according to some embodiments of the invention may include rule logic, weights and metadata, for example, as listed hereinbelow:

a. Language identification (ID): rules may be language specific. Language ID is included in the metadata to ensure rule sets only used on interactions with the same language.
b. Rule type: may define processing, postprocessing or overriding attributes associated with the rule. For example, the rule type attribute may be:
   1. FRUSTRATION: may specify a standard frustration rule with no special postprocessing or overriding.
   2. FRUSTRATION_A_PRIORI: an override attribute that may specify a rule requiring override handling aimed at increasing the final frustration level or aimed at setting the interaction to frustrated. In some circumstances, an interaction that includes a frustration cue or expression that was found based on a "FRUSTRATION_A_PRIORI" rule, may be classified as including frustration, regardless of the results of the classifier.
   3. NEUTRALIZE: an override attribute that may specify a rule requiring override handling aimed at decreasing the final frustration level or at setting the interaction to non-frustrated. In some circumstances, an interaction that includes a "NEUTRALIZE" rule, may be classified as not including frustration, regardless of the results of the classifier and any other processing of the interaction.

4. NEGATION: A functional rule, optionally used by other frustration rules, that encodes environments for linguistic negation. The environments for linguistic negation may include negation signifiers, such as "not" or "never", and a proximity window. These negation signifiers may neutralize or cancel frustration cues detected by other frustration rules if they are found in proximity to the other frustration cue. Other frustration rules that require negation handling according to a "NEGATION" type rule may encode this in the Rule Behavior component described hereinbelow. A "NEGATION" type rule may be defined with a negation signifier (e.g. "never") and a proximity window. The proximity window specifies how close any frustration rule match can be to the negation signifier in order for matches to be suppressed. For example, a negation rule may specify the negation signifier "never" and a window of three tokens, e.g., the negation signifier "never" may be up to three words or tokens away from the detected rule logic. The frustration rule logic specifies whether the presence of a negation rule match within that proximity window should cause it to be suppressed. Individual frustration rules reference which of these negation rules should affect their matches so that a given frustration rule could be sensitive to all forms of negation, or a subset of the negation rules, or none at all.

5. INTENSIFIER: A functional rule, optionally used by other frustration rules, that encodes environments for linguistic boosting. Environments for linguistic boosting may include linguistic intensifiers, such as "extremely" or "totally", and a proximity window. These linguistic intensifiers do not, in and of themselves, produce frustration, however, they may boost the strength of other frustration cue, e.g., by increasing the weight of the other frustration cue if they are found in proximity to the other frustration cue match. Other frustration rules that require intensifier handling according to a "INTENSIFIER" type rule may encode this in the Rule Behavior component. An "INTENSIFIER" type rule may also include a proximity window. For example, the weight of the other cue when found alone may be for example 0.34. However, the weight of the same cue in the presence of the "INTENSIFIER" rule (encode this in the Rule Behavior component) may increase, for example to 0.5.

c. Rule group: rules may be placed in groups of morphologically and semantically related frustration cues, in order to perform semantic normalization (e.g., unifying different expressions of the same thing). In this way, morphological variants such as "frustrate" and "frustrating," or semantically related cues, such as "been several hours" and "been three hours," may be placed in the same group and thus may be treated the same way by the system.

d. Rule logic: specifies the natural language patterns expressing frustration, such as "frustrating" or "ridiculous". Rule logic may include:
 i. Single tokens (e.g., words) and/or phrases.
 ii. Token operators, such as "any", "optional", and "not". The token operators may be associated with the single tokens or phrases of the rule. For example, associating the token operator 'not' to a token may indicate the natural language pattern should not include the associated token. Associating the token operator "any" to a group of tokens or phrases may indicate it is enough to find only one of these tokens or phrases to qualify for a match. Other token operators may be used. The token operator "optional" may permit optional language. For example, associating the token operator "optional" to the token "still" may permit matches with or without the token "still", such as: "I'm (still) waiting", where "still" is optional.
 iii. Proximity operators, indicating unidirectional or bidirectional proximity of some tokens on either side of other tokens specified in the rule. Thus, for a rule match, the defined tokens must be found in the defined proximity and direction with relation to the other tokens. Proximity operators can be marked with the not operator, indicating that they should not occur within the co-occurrence set e. Rule behavior: optional special handling for contextual features around the rule logic may be encoded. Contextual features may include proximity with other linguistic phenomena, such as negation signifiers or intensifiers, which may be used to filter a frustration cue out or boost its strength in the scoring process. For example, "APPLY_NEGATION" may neutralize the frustration for a "FRUSTRATION" type linguistic rule in the presence of a negation signifier. For example, "The instructions are confusing" may be detected as a frustration cue by a "FRUSTRATION" type linguistic rule, but "The instructions are not confusing" will not if the rule behavior attribute of the linguistic rule is "APPLY_NEGATION". "DEFAULT" may define no special handling. Other rule behavior attributes may be used.

f. Rule parameters: Machine learned parameters, including weights specifying the likelihood that the cue occurred within a frustrated interaction in the training dataset. These weights are used together to calculate the effect of the linguistic rule on the frustration score. Rule parameters may include:
 i. Weight: a measure of how important a rule group is in indicating frustration.
 ii. Mean: the frequency of the term on average with respect to the training dataset.
 iii. Variance: how much variation in the frequency occurs in the rule with respect to the training dataset.

Rule metadata may include override attributes, such as "FRUSTRATION_A_PRIORI" and "NEUTRALIZE" attributes. Other override attributes may be used. The override attributes may dictate special handling of the interaction. For example, if an interaction does not include frustration cues with override attributes, then the frustration level in the interaction may be determined or calculated based on the frustration cues and associated identified natural language patterns and weights associated with the identified frustration cues (and associated identified natural language patterns). Calculation of the frustration level in the interaction based on the weights associated with the identified frustration cues may be performed using a trained ML model, as disclosed herein. However, according to embodiments of the invention, if the interaction does include frustration cues with override attributes then the frustration level in the interaction may be determined or calculated based on the identified override attributes.

It should be noted that a single interaction may include one or more frustration cues or expressions that include override attributes (as part of the rule metadata). For example, a single interaction may include one or more frustration cues or expressions that were found based on a "FRUSTRATION_A_PRIORI" rule, as well one or more frustration cues or expressions that were found based on a "NEUTRALIZE" rule. If both "FRUSTRATION_A-

_PRIORI" attributes and "NEUTRALIZE" attributes are associated with a single interaction, the final frustration level of the interaction may be determined based on all override handling attributes using predefined logic, as disclosed herein. Other overriding types, logic and rules may be used.

In some embodiments, rule parameters may be calculated per each rule. In some embodiments, rule parameters may be calculated per rule group and stored in each rule metadata. Other parameters may be calculated and used.

Rule metadata may include information specifying properties of the rule, including for example override attributes or capabilities, special handling capabilities, rule type, rule group language identification and rule behavior. In some embodiments, the linguistic rules may be encoded with the above attributes and structured according to the following example template (other templates may be used):

```
{
"languageId": <string>,
"group": <string>,
"name": <string>,
"ruleLogic": <string>,
"comments": {
"example": <string>
},
"ruleType": <string>,
"ruleBehavior": [<string>],
"weights": {
"weight": <num>,
"groupMean": <num>,
"groupVariance": <num>
}
}
```

Examples of linguistic rules are provided hereinbelow. In the following example the rule type is "FRUSTRATION", the rule logic includes a single token "horrible", the rule behavior is "DEFAULT". Thus, this rule may find the frustration cue "horrible" in interactions, may not impose any postprocessing or overriding of the classifier results, and may give any occurrence of the single token "horrible" in the interaction a weight of 0.1285. Example code of a "FRUSTRATION" rule type may include:

```
{
"languageId": "EN",
"group": "Negative Attributes",
"name": "horrible",
"ruleLogic": "horrible",
"comments": {
"example": "This process is horrible."
},
"ruleType": "FRUSTRATION",
"ruleBehavior": ["DEFAULT"],
"weights": {
"weight": 0.12854286813299773,
"groupMean": 0.05026722519139101,
"groupVariance": 0.12920800312485858
}
}
```

In the following example the rule type is "FRUSTRATION_A_PRIORI", the rule logic includes a single token "frustrated", the rule behavior is "DEFAULT". Thus, this rule may find the frustration cue "frustrated" in interactions, may impose overriding of the classifier results to "frustrated", or as defined by the overriding logic in case more rules with overriding capabilities are found in the interaction. This rule may give any occurrence of the single token "frustrated" in the interaction a weight of 0.49249. Example code of a "FRUSTRATION_A_PRIORI" rule type may include:

```
{
"languageId": "EN",
"group": "Emotions - Anger & Irritation",
"name": "frustrate",
"ruleLogic": "frustrated",
"comments": {
"example": "I'm just really frustrated."
},
"ruleType": "FRUSTRATION_A_PRIORI",
"ruleBehavior": ["DEFAULT"],
"weights": {
"weight": 0.4924903691882023,
"groupMean": 0.12783475371948577,
"groupVariance": 0.2464056396010769
}
}
```

The following provides an example of a "NEGATION_DIST_2" rule type. The rule logic includes a single token "not" and the rule behavior is "DEFAULT". Thus, this rule may find the negation intensifier "not" in interactions, at a distance of up to two tokens from a frustration cue found by another linguistic rule. In case of a match, this rule may neutralize or cancel frustration cues detected by the other frustration rule. This rule does not have a weight on its own. For example, if a search by another rule has found a match for "big problem", and a "NEGATION_DIST_2" rule has found the token "not" up to two tokens away from the "big problem", this occurrence of "big problem" in the interaction will not be considered as a frustration cue. Example code of a "NEGATION_DIST_2" rule type may include:

```
{
"languageId": "EN",
"group": "Negation",
"name": "NEGATION - not",
"ruleLogic": "not",
"comments": {
"example": "These are not particularly big problems."
},
"ruleType": "NEGATION_DIST_2",
"ruleBehavior": ["DEFAULT"],
"weights": { }
}
```

Figure 4:
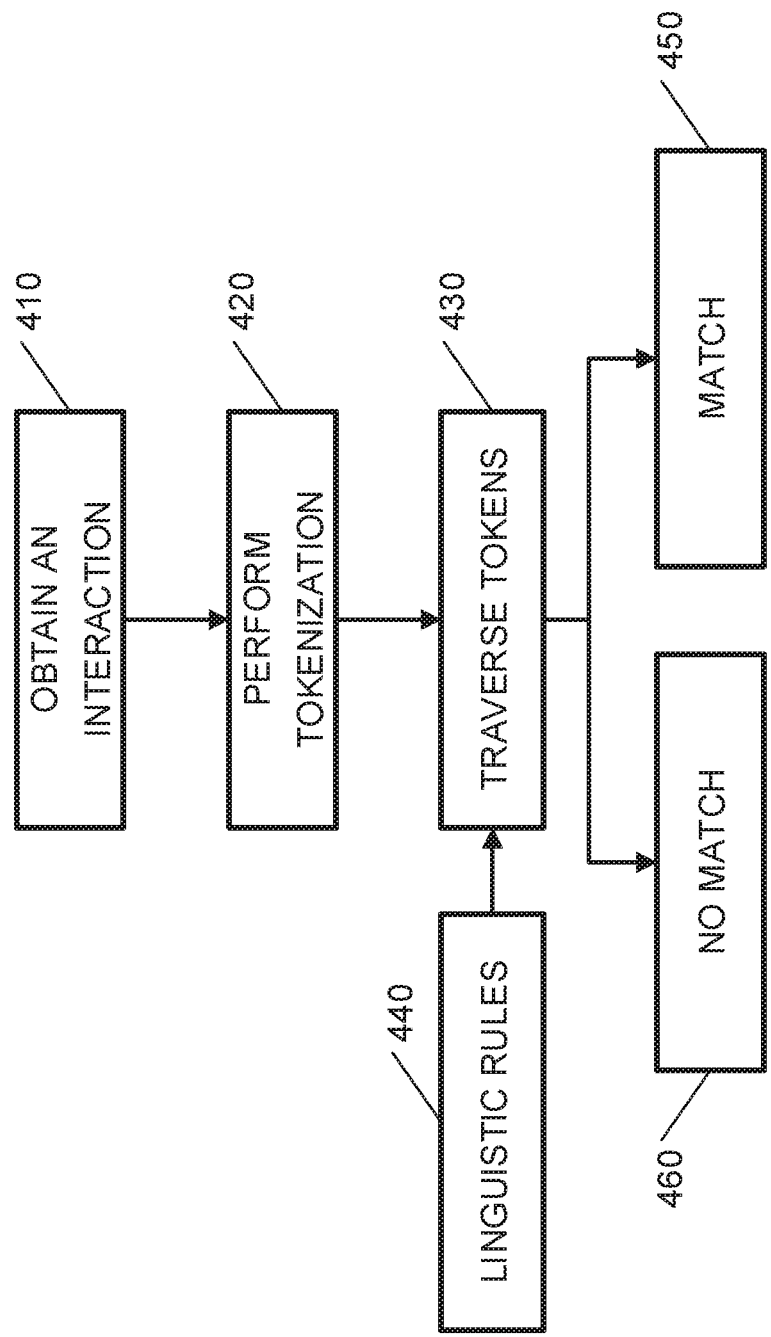
FIG. 4 is a flowchart of a method for identifying frustration cues in interactions, according to embodiments of the present invention.

Reference is now made to FIG. 4 which is a flowchart of a method for identifying frustration cues in interactions, according to embodiments of the present invention. While in some embodiments the operations of FIG. 4 are carried out using systems as shown in FIGS. 1 and 2, in other embodiments other systems and equipment can be used.

According to embodiments of the invention, frustration cues may be identified in interactions using linguistic rules, for example, the linguistic rules generated as disclosed herein. These linguistic rules may be encoded with the targeted frustration cue (e.g., the rule logic), the weights to be used by the frustration scoring function, and any special handling required by the linguistic rule. The linguistic rules may be grouped together into morphologically and semantically related groups, in order to perform semantic normalization and ensure consistent behavior across similar rules.

In operation 410 an interaction may be received or obtained. For example, documents containing transcripts of interactions, or other documents, may be produced or obtained. For example, ASR (e.g. using ASR module 22, e.g.

executed by a processor) may be used to process interactions such as telephone calls (e.g. audio recordings), to produce text transcripts or documents. While transcripts of interactions are discussed herein, documents other than transcripts may be used, and ASR processing need not be used. A large corpus of documents (e.g. 50,000 to 500,000, or over a million) such as transcripts to be analyzed may be processed or created.

In operation 420 tokenization of the interaction may be performed. Tokenization may refer to the process of separating the contents of the interaction into tokens based upon language specific properties. For example, for Latin based languages the system may scan for whitespace and punctuation. Whitespace characters delimit one token from another. Punctuation characters may become tokens themselves and delimit adjacent tokens. For Chinese, Japanese and Korean languages, other tokenization mechanisms may be applied. The token matching is case-insensitive where applicable. In operation 430 the tokens may be traversed. The tokens may be traversed in sequence in which they appear in the interaction. Traversing the tokens may include comparing the tokens from the interaction to the tokens in the linguistic rules 440, starting at the lowest offset and traversing through all tokens in sequential and logical order.

A token or a group of tokens may be considered a match, as indicated in block 450, or not a match, as indicated in block 460. A token or phrase may be considered a match 450 if the token or phrase matches the conditions set by the rule logic. For each rule match, the encoded frustration information is attached to the interaction in which the match occurred or is otherwise saved, e.g., in a log file. The offsets of the matching text including intervening tokens may be also stored on the interaction or log file for further processing and highlighting purposes. The original interaction along with the additional rule information may be passed through to the frustration scoring.

The following provides an example of how an interaction including frustrated contact, containing frustration cues with no special behavior, may be analyzed. In this case, the frustration is being evaluated and detected in the patron side of the document.

Input: full interaction text:
Agent: Good afternoon, thank you for calling Awesome Company. You're speaking with Karen, how can I help you?
Patron: Hi. My name is Ned. I ordered Awesome Product three and a half weeks ago. It's been weeks and it still hasn't arrived. What's going on? I've been waiting forever.
Agent: I'm so sorry to hear that. Have you checked the tracking online?
Patron: I've tried to, but your website is so confusing that I can't even find the link.
Agent: I can help you with that. Do you have the order number?
Patron: It's AN456983.
Agent: Can you please hold while I check on it?
Patron: Yes.
Agent: Ok. I've found your order. It appears that Awesome Product is backordered. It won't ship for another 2 weeks.
Patron: Why wasn't I informed about this? Your communication is absolutely horrible.
Agent: I'm sorry about that.
Patron: You know what? Just cancel the order. I don't want to keep waiting.
Agent: Are you sure?
Patron: Yes.
Agent: Ok. I've gone ahead and cancelled that order. Is there anything else I can help you with?
Patron: No. That's it.
Agent: I hope you have a good rest of your day.
Patron: Bye.

The patron side of the document may be analyzed. The content of the interaction may be tokenized and traversed to identify linguistic rule matches. In this example, five matches were found "been weeks", "been waiting", "confusing", "horrible" and "keep waiting". These items are highlighted in the patron-side part of the interaction below:
Hi. My name is Ned. I ordered Awesome Product three and a half weeks ago. It's been weeks and it still hasn't arrived. What's going on? I've been waiting forever.
I've tried to, but your website is so confusing that I can't even find the link.
It's AN456983.
Yes.
Why wasn't I informed about this? Your communication is absolutely horrible.
You know what? Just cancel the order. I don't want to keep waiting.
Yes.
No. That's it.
Bye.

The patron-side part of the interaction may be encoded with the information presented in Table 1 for the five rule matches and passed through to the frustration scoring function. Table 1 presents a log (e.g., a log file) of all detected frustration cues and associated metadata.

TABLE 1

An example log of all detected frustration cues in an interaction and associated metadata.

| Matched Text | Rule Group | Beginning Offset | Ending Offset | Special Handling | Weight | Group Mean | Group Variance |
| --- | --- | --- | --- | --- | --- | --- | --- |
| been weeks | been time | 79 | 89 | apply negation handling | 0.0615109 | 0.0176224 | 0.0228008 |
| been waiting | wait again | 141 | 153 | none | 0.0965402 | 0.0368337 | 0.0597439 |
| confusing | confuse | 201 | 210 | apply negation handling | 0.0575414 | 0.0738119 | 0.2009652 |
| horrible | horrible | 331 | 338 | none | 0.1285428 | 0.0502672 | 0.1292080 |
| keep waiting | wait again | 395 | 407 | none | 0.0965402 | 0.0502672 | 0.1292080 |

Figure 5:
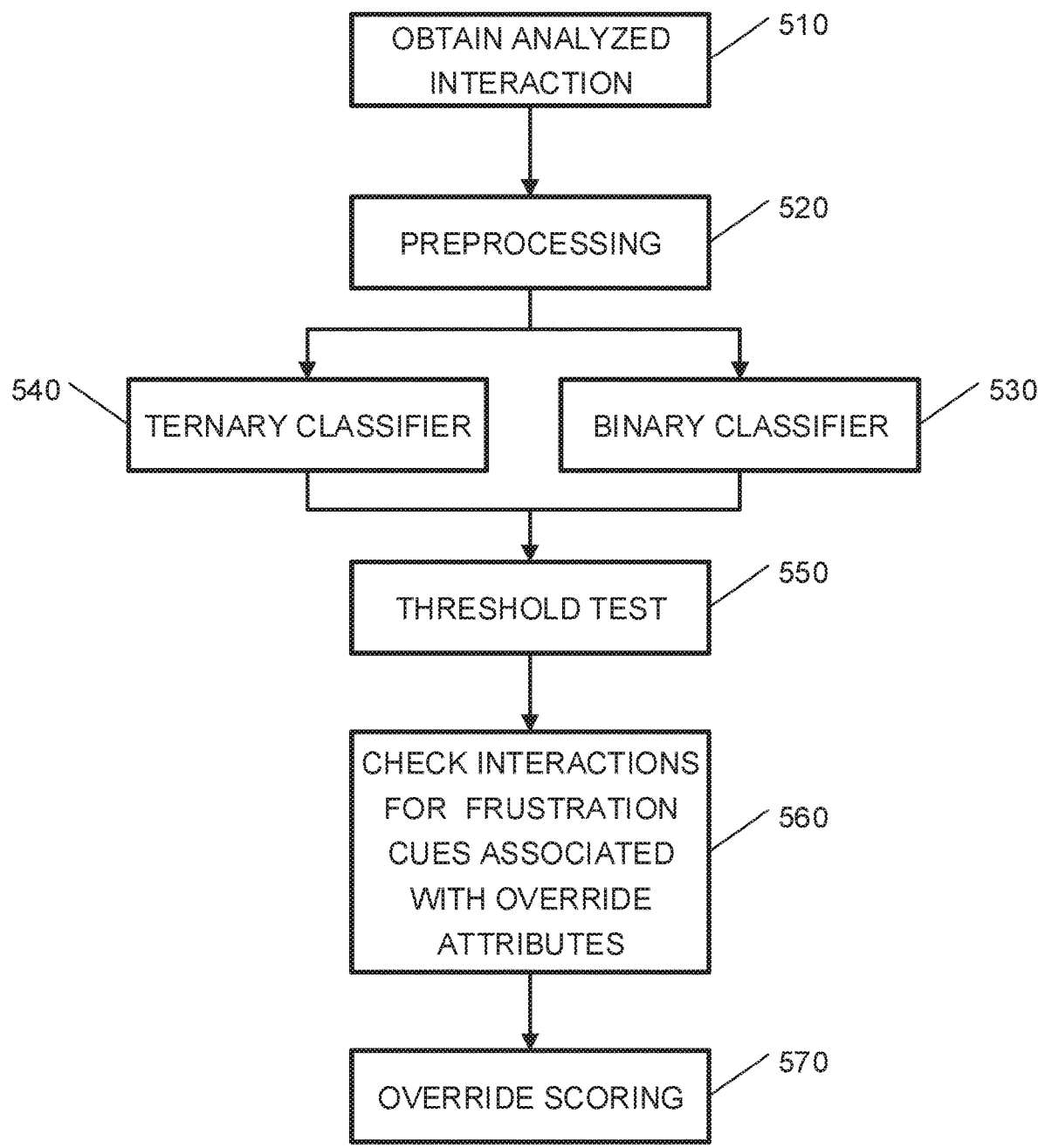
FIG. 5 is a flowchart of a method for frustration scoring and determining the level of frustration, according to embodiments of the present invention.

Reference is now made to FIG. 5 which is a flowchart of a method for frustration scoring and determining the level of frustration, according to embodiments of the present invention. While in some embodiments the operations of FIG. 5 are carried out using systems as shown in FIGS. 1 and 2, in other embodiments other systems and equipment can be used.

In operation 510 analyzed interactions may be obtained. The analyzed interaction may include the text of the interactions, or the test of one speaker in the interaction, and a log of all detected frustration cues and associated metadata. In operation 520, preprocessing may be performed. Preprocessing may include checking the analyzed interaction for cue count and specialized metadata, such as rule types requiring overriding. In some embodiments, preprocessing may include removing all frustration cues and associated metadata or nulling (e.g., zeroing) the weights associated with the detected frustration cues for interactions containing a low count of semantically weaker frustration cues, e.g., no frustration cues with "FRUSTRATION_A_PRIORI" rule type, or with weights above a threshold, and frustration cues count below a threshold, e.g., two, three, etc. Without the associated weights, these interactions may be treated identically to interactions without any frustration cues. Linguistic rule matches "high-powered" frustration cues (e.g., including "FRUSTRATION_A_PRIORI" rule type) may be exempt from the frustration cue count in the preprocessing stage. Rules encoded with or including "FRUSTRATION_A_PRIORI" rule type typically contain "high-powered" cues, such as "supervisor" mentions, which can contribute significantly to frustration on their own.

After the preprocessing step, a frustration score indicative of the probability that the interaction contains frustration may be calculated by an ML model such as a classifier, e.g., a binary classifier in operation 530 or a ternary classifier in operation 540. Other ML models and classifiers may be used. The type of the classifier (e.g., binary classifier or ternary classifier) may be selected based on the desired scale and output values. In some embodiments, one of a binary classifier (operation 530) and a ternary classifier (operation 540) may be used. A binary classifier as in block 530 may fit a binary scale. A ternary classifier as in block 530 may fit a ternary scale. A binary classifier implemented using binomial logistic regression with sigmoid function supports two values: frustrated and non-frustrated. A ternary classifier implemented using multinomial logistic regression algorithm with softmax function supports three values: high frustration, medium frustration and no frustration. Both classifiers may produce frustration scores on a standard 0-1.0 scale. The frustration score may be indicative of the probability that the interaction contains frustration, or of the level of frustration in the interaction.

An example of binary classification calculation is disclosed herein. Other methods for classification may be used. For an interaction $d_x$, linguistic rule matching may be performed according to embodiments of the method for identifying frustration cues in interactions disclosed herein. A cue threshold of minCues, may be determined during development. If $d_x$ has frustration cues number that is equal or fewer than minCues and no "high-powered" frustration cues, the interaction may be marked as non-frustrated and a FrustrationScore$_{(d_x)}$ of <0> (zero, meaning no frustration) may be assigned to the interaction.

For an interaction that contains more than minCues frustration cue matches or at least one "high-powered" frustration cue, frustration cues may be organized or grouped according to rule groups. These rule groups may be units that group together thematically and linguistically related patterns. For $d_x$ a vector (e.g., an ordered list of values) of these rule group counts $RG_{\{i\ldots n\}}$ may be generated:

$$RG_{\{i\ldots n\}}=(rg_1, rg_2, \ldots, rg_{\{n-1\}}, rg_n),$$

Where $rg_i$ is the count of linguistic rule matches for rule group i.

Standardization may be applied to the count of linguistic rule matches, $rg_i$, to create a standard vector $RGS_{\{i\ldots n\}}$:

$$RGS_{\{i\ldots n\}}=(\text{Standard}(rg_1), \text{Standard}(rg_2), \ldots, \text{Standard}(rg_{\{n-1\}}), \text{Standard}(rg_n))$$

Where Standard(x) is a standard scaling function:

$$\text{Standard}(x_{rg}) = \frac{x_{rg} - \mu_{rg}}{\sigma_{rg}},$$

Where $\mu_{rg}$ and $\sigma_{rg}$ are the mean and standard deviation (e.g., square root of the variance) for the corresponding rule group as calculated from development data, e.g., in operation 330.

The FrustrationScore may be calculated with $RGS_{\{i\ldots n\}}$ and a similar vector of rule group weights $w_{\{i\ldots n\}}$: $w_{\{i\ldots n\}}=(w_1, w_2, w_{\{n-1\}}, w_n)$, where $w_i$ is the weight for rule group i. A bias term b may be calculated during the same training process as $w_{\{i\ldots n\}}$ (e.g., in operation 330). In some embodiments, $w_{\{i\ldots n\}}$ and b were both calculated using standard implementations of logistic regression, for example, using $l_2$ regularization with a SAGA solver such as the one provided by scikit-learn (a free software machine learning library for the Python programming language). Other solvers may be used.

An initial or starting frustration score, providing an indication of the level of frustration in the interaction, may be calculated by:

$$\text{FrustrationScore}_{\{d_x\}} = \text{Log}(w_{\{i\ldots n\}}^T \cdot RGS_{\{i\ldots n\}} + b)$$

$w_{\{i\ldots n\}}^T$ is the transposition of $w_{\{i\ldots n\}}$ and Log(x) is the logistic function:

$$\text{Log}(x) = \frac{e^x}{e^x + 1},$$

Where e is Euler's number.

An example of a ternary classification calculation is provided herein below. Other ternary classification calculations may be used. Ternary frustration includes the classes high frustration, medium frustration and none (no frustration). The process for calculating ternary frustration is very similar to binary frustration described above. It is identical through the generation of $RGS_{\{i\ldots n\}}$. A primary difference is that there are three sets of coefficients and bias terms, one for each class, $w_{High\{i\ldots n\}}$, $w_{Medium\{i\ldots n\}}$, $w_{None\{i\ldots n\}}$ and $b_{High}$, $b_{Medium}$, and $b_{None}$.

Scores may be calculated for each of the three classes:

$$\text{Score}_{High} = w_{High\{i\ldots n\}}^T \cdot RGS_{\{i\ldots n\}} + b_{High}$$

$$\text{Score}_{Medium} = w_{medium\{i\ldots n\}}^T \cdot RGS_{\{i\ldots n\}} + b_{Medium}$$

$$\text{Score}_{None} = w_{None\{i\ldots n\}}^T \cdot RGS_{\{i\ldots n\}} + b_{None}$$

The interaction may be assigned the frustration class and frustration score corresponding to the maximum score given by a softmax function:

$$\text{FrustrationScore}_{\{d_x\}} = \max_i^3(\text{softmax}(i, (\text{Score}_{High}, \text{Score}_{Medium}, \text{Score}_{None})))$$

$$\text{softmax}(\text{class}_i, (\text{Score}_{Class_i}, \ldots, \text{Score}_{Class_n})) = \frac{e^{\{\text{Score}_{class_i}\}}}{\sum_i^n(e^{\{\text{Score}_{class_i}\}}, \ldots, e^{\{\text{Score}_{class_n}\}})}$$

The coefficients $w_{High\{i \ldots n\}}$, $w_{Medium\{i \ldots n\}}$, and $w_{None\{i \ldots n\}}$ and bias terms $b_{High}$, $b_{Medium}$ and $b_{None}$ may all be calculated using standard implementations of multinomial logistic regression, for example, using $l_2$ regularization and a SAGA solver. Other solvers may be used.

In alternative operations 530 and 540, a frustration score, FrustrationScore$_{\{d_x\}}$, providing an estimation that an interaction contains frustration may be calculated. In operation 550 a threshold test may be performed. The threshold test may evaluate the frustration score, FrustrationScore$_{\{d_x\}}$, against a threshold to determine the initial frustration level of the interaction. The threshold may be determined in the training phase and may be optimized for a specified level of precision. In case of binary classification, a single threshold may be required to differentiate frustrated from non-frustrated. For example, it may be determined that the interaction contains frustration if the frustration score exceeds a first threshold. In case of ternary classification, two thresholds may be required to differentiate high frustration from medium frustration, and medium frustration from non-frustrated.

In some embodiments, both the score as calculated and the classification are stored or passed through for further processing. For example, given a threshold of 0.8, a score of 0.85 is above the threshold and therefore produces a value of frustrated on a binary scale. The classification as well as the 0.85 score may be passed through. If the score falls below the specified threshold, a non-frustrated classification may be assigned, and the score may be passed through as calculated. Using the above scale, for example, a score of 0.15 produces a classification of non-frustrated. The classification as well as the score may be passed through to the scoring override function 560 and 570.

In operations 560 and 570, scoring override may be performed. The override scoring operation or function may include, in operation 560, checking interactions for the identified frustration cues that should trigger exceptional handling that overrides the default calculations of the classifier, e.g., frustration cues associated with override attributes such as "FRUSTRATION_A_PRIORI" and/or "NEUTRALIZE" attributes. Override scoring operation 570 may adjust, change or replace the frustration level and score of interactions so that the final frustration level and score would be determined based on the override attributes and not provided by the classifier and threshold test. Override scoring operation 570 may provide a smart layer imitating human understanding and intuition for counterbalancing the classifier's calculations.

Operation 560 may scan the frustration cues with overriding capabilities or overriding attributes, e.g., frustration cues with "FRUSTRATION_A_PRIORI" and/or "NEUTRALIZE" in an interaction, and override scoring operation 570 may replace the classification provided by the classifier, or may determine the frustration level in the interaction based on the presence, the type and the number of overriding attributes in the interaction.

For example, if frustration cues with only "FRUSTRATION_A_PRIORI" overriding attributes are found, (e.g., one or more frustration cues with "FRUSTRATION_A_PRIORI" overriding attribute and no frustration cues with "NEUTRALIZE" overriding attributes is found), than the classification of the interactions may be changed to indicate that the interaction includes frustration. For example, the highest intensity frustration level may be assigned to the interaction based upon the selected scale ("frustrated" or "high frustration"). The frustration score may be boosted to 1.0. For example, the score of an interaction with a calculated score below the threshold which also contains a semantically strong frustration cue encoded as "FRUSTRATION_A_PRIORI", may be boosted to 1.0.

On the other hand, if frustration cues with only a "NEUTRALIZE" overriding attributes are found, (e.g., one or more frustration cues with "NEUTRALIZE" overriding attribute and no frustration cues with "FRUSTRATION_A_PRIORI" overriding attributes is found), than the classification of the interactions may be changed to indicate that the interaction does not include frustration. For example, the lowest intensity frustration level may be assigned to the interaction, e.g., not frustrated. The frustration score may be lowered to 0. For example, the score of an interaction with a calculated score above the threshold which also contains a frustration cue encoded as "NEUTRALIZE", may be lowered to 0.

If an interaction includes both frustration cues with "FRUSTRATION_A_PRIORI" and "NEUTRALIZE" overriding attribute, a logic may be defined to determine if and how overriding may be performed. Table 2 presents an example of overriding logic. Other overriding logic may be used. For example, the number of with "FRUSTRATION_A_PRIORI" cues and "NEUTRALIZE" cues in an interaction may be counted and overriding may be determined according to the differences in the number of occurrences of these cues.

TABLE 2

Overriding logic.

| "FRUSTRATION_A_PRIORI" cues | "NEUTRALIZE" cues | Final frustration level and score |
|---|---|---|
| No | No | As determined by the classifier |
| No | Yes | Non-frustrated, score = 0.0 |
| Yes | No | Frustrated, score = 1.0 |
| Yes | Yes | Non-frustrated, score = 0.0 |

Table 3 presents another example of overriding logic. In this example, three types override attributes are used, "FRUSTRATION_A_PRIORI", "FRUSTRATION_MEDIUM" and "NEUTRALIZE".

TABLE 3

Overriding logic with three types of override attributes.

| "FRUSTRATION_A_PRIORI" cues | "FRUSTRATION_MEDIUM" cues | "NEUTRALIZE" cues | Final Frustration Level and Score |
|---|---|---|---|
| No | No | No | As determined by the classifier |
| No | No | Yes | Non-frustrated, score = 0.0 |
| Yes | No | No | High Frustration, score = 1.0 |
| Yes | No | Yes | Non-frustrated, score = 0.0 |
| No | Yes | No | Medium Frustration, score = 0.5 |
| No | Yes | Yes | Non-frustrated, score = 0.0 |
| Yes | Yes | No | High Frustration, score = 1.0 |
| Yes | Yes | Yes | Non-frustrated, score = 0.0 |

Continuing the example interaction provided herein above, with a binary scale, a frustration threshold of 0.6 and a frustration cue count threshold of four, the process may be performed as follows:

Preprocessing: the number of frustration cues detected in the interaction may be checked to ensure that the frustration cue count is at or above the permitted threshold (four). In this case, there are five frustration cues, so no changes are made to the weights, which are passed to the weight calculation as-is.

Weight calculation: because a binary frustration score is used, the frustration scoring function uses binomial logistic regression classifier and the weights as calculated in operation 330 to calculate the frustration score. With the given weights, the frustration score is calculated as 0.8794.

Threshold Test: The threshold test is then applied to verify that the frustration score is above 0.6. As the frustration score is 0.8794, a frustration value of "Frustrated" is assigned. The frustration value, "Frustrated", and the score "0.8794" are passed through to the override scoring process.

Override scoring: the override scoring process then checks the interaction for any frustration cues that require special overriding according to the rules metadata, e.g., frustration cues with "FRUSTRATION_A_PRIORI" or "NEUTRALIZE" attributes. In this example, no frustration cues are encoded with any override attributes, so the interaction is passed downstream with the information presented in Table 4.

TABLE 4

Example interaction information.

| Frustration Value | Frustration Score | Frustration Offsets |
|---|---|---|
| Frustrated | 0.8794 | 79-89 |
| | | 141-153 |
| | | 201-210 |
| | | 331-338 |
| | | 395-407 |

Figure 6:
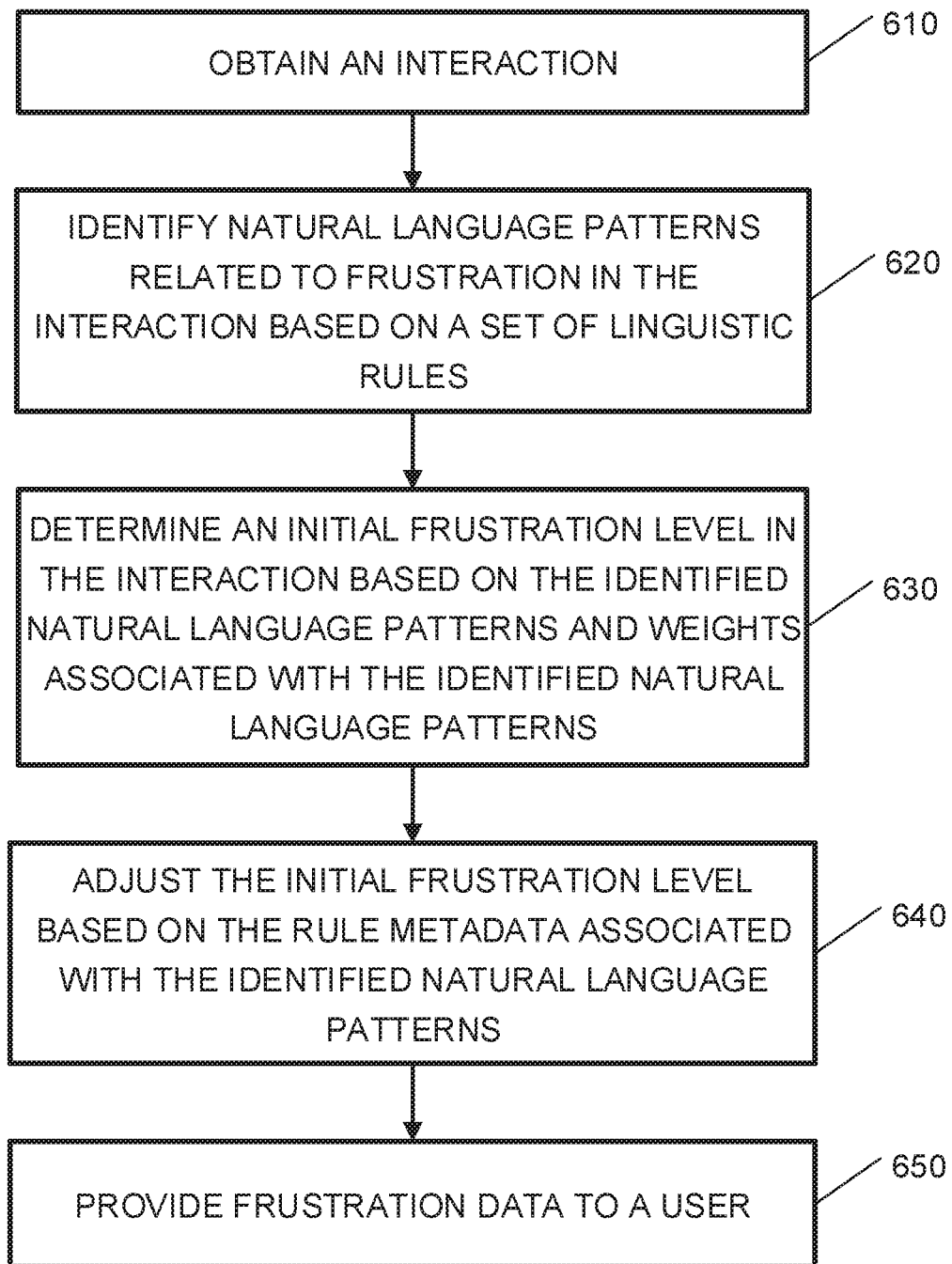
FIG. 6 is a flowchart of a method detecting frustration in an interaction, according to embodiments of the present invention.

Reference is now made to FIG. 6 which is a flowchart of a method detecting frustration in an interaction, according to embodiments of the present invention. While in some embodiments the operations of FIG. 6 are carried out using systems as shown in FIGS. 1 and 2, in other embodiments other systems and equipment can be used.

In operation 610, an interaction may be received or obtained, similarly to operation 410. In operation 620, natural language patterns related to or associated with frustration (also referred to as frustration cues) may be identified in the interaction, using a set of linguistic rules. The linguistic rules may further define weights associated with the natural language patterns and rule metadata. The linguistic rules may be generated according to the method for generating linguistic rules for identifying natural language patterns related to frustration in interactions, e.g., as disclosed herein with relation to FIG. 3. In operation 630, an initial frustration level in the interaction may be determined based on the identified natural language patterns and weights associated with the identified natural language patterns. The initial frustration level may be determined by identifying frustration cues in interactions, e.g., as disclosed herein with relation to FIG. 4, and performing preprocessing, classification and threshold test, e.g., as in operations 520, 530, 540 and 550. In operation 640, the initial frustration level may be adjusted or modified based on the rule metadata associated with the identified natural language patterns to provide a final frustration level, e.g., as in operations 560 and 570.

In operation 650 frustration data may be provided or displayed to a user. According to some embodiments, once frustration scoring and overriding is completed and the final frustration level and score is determined, the relevant information may pass downstream for use as disclosed herein. This information may include the following:

The frustration level, such as "frustrated" or "non-frustrated", which may be presented in various visualizations such as overview widgets, may be correlated with other KPIs and presented in application dashboards containing other widgets measuring additional KPIs, such as Silence Detection (a KPI measuring silence level in an interaction) or Overtalk (a KPI measuring talking too much in an interaction).

The frustration score, which may also be displayed with the frustration level and correlated with other KPIs.

The offset of the matching text for each frustration cue. The text offset information may be used to visually highlight the frustration cues in each contact.

Figure 7:
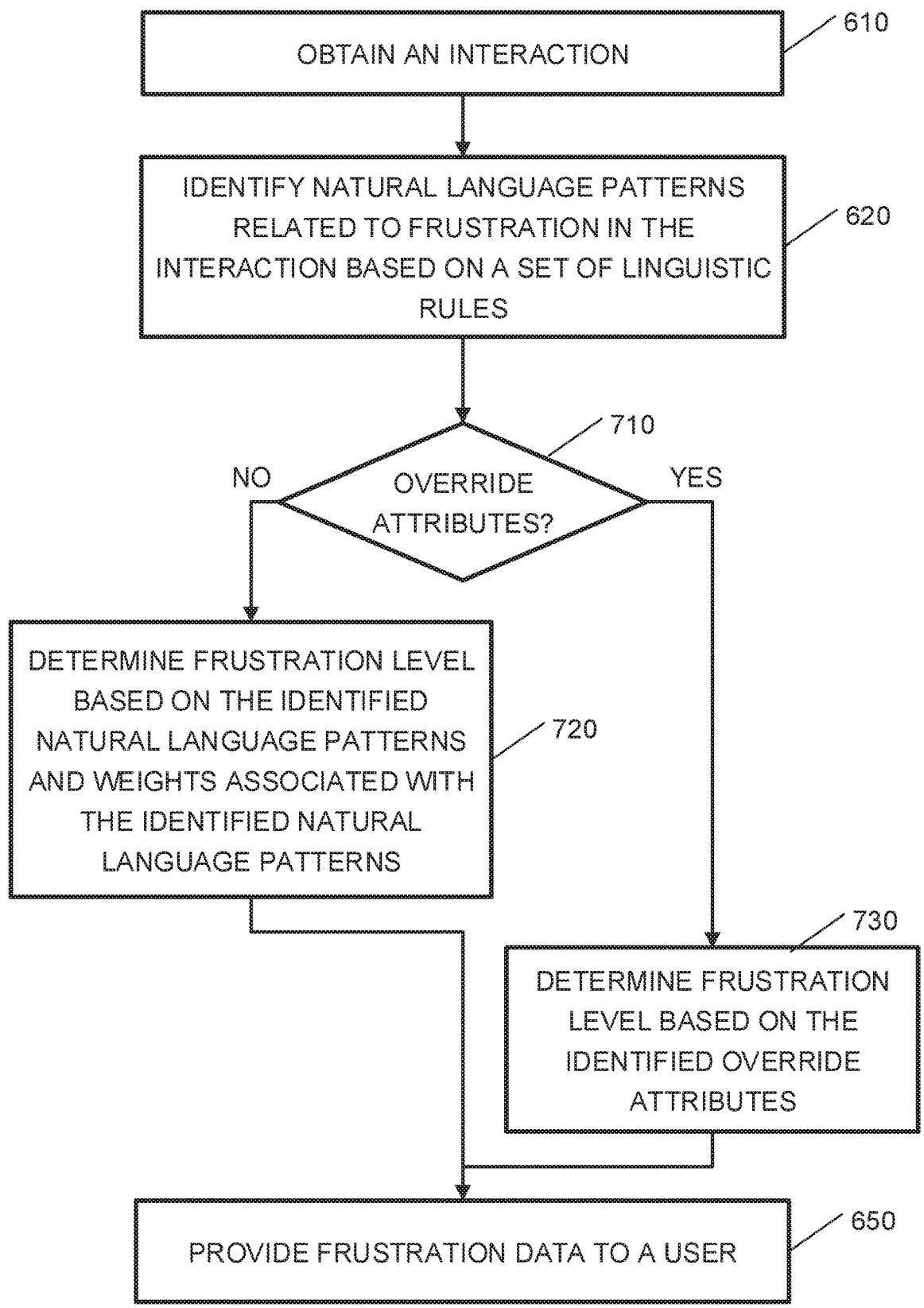
FIG. 7 is a flowchart of a second method detecting frustration in an interaction, according to embodiments of the present invention.

Reference is now made to FIG. 7 which is a flowchart of a modified method detecting frustration in an interaction, according to embodiments of the present invention. While in some embodiments the operations of FIG. 7 are carried out using systems as shown in FIGS. 1 and 2, in other embodiments other systems and equipment can be used.

Operations 610, 620 and 650 may be similar to corresponding operations in FIG. 6. In operation 710, the rule metadata associated with the identified natural language patterns (e.g. as identified in operation 620) may be reviewed to identify override attributes. If the rule metadata do not include override attributes, then in operation 720 a frustration level in the interaction may be determined based on the identified natural language patterns and weights associated with the identified natural language patterns using the ML model, for example similarly to operations 520, 530, 540 and 550. However, if the rule metadata include override attributes, then in operation 730 the frustration level may be determined based on the identified override attributes, for example similarly to operation 570. Thus, embodiments of the modified method detecting frustration in an interaction presented in FIG. 7 may provide a significant reduction in computing power required for calculating the frustration level in interactions relatively to calculating the level of frustration using an ML model, since in the interactions that include override attributes, there is no need to calculate a frustration level using an ML model.

On its own, the frustration score and level may provide insights into interactions between parties, which can drive improvements in the contact center. The frustration score and level may be reviewed at multiple levels: an individual interaction, individual agents or consumers, teams or an aggregate view of the call center. Furthermore, the frustration score and level may quantify the lifecycle of frustration within a single interaction or spanning multiple interactions. Determining the frustration score and level within segments or sections of a single interaction may provide a more detailed view of consumers' frustration as the interaction unfolds with a single agent. By dividing or segmenting interactions into smaller segments, and providing a frustration level for each segment, the peaks and valleys of frustration may be surfaced as they relate to specific stages of the conversation. In this way, the user may determine whether the frustration rose, fell, or remained stable in relation to specific aspects of the interaction in an actionable way.

An interaction may be segmented in various ways, depending on the application. For example, an interaction may be segmented to speaker turn pairs, phases of the call (such as intent detection, issue resolution and troubleshooting, etc.) or simply according to timestamps (frustration in $1^{st}$ minute, $10^{th}$ minute, etc.). In one embodiment the interaction may be segmented into the following conceptual phases via a combination of linguistic analysis and timing constraints:

The initialization of the call, defined as the initial greeting, problem statement, and information gathering.

Problem solving, based upon agent answers and instructions for addressing the problem statement.

Resolution, based upon the agent solving the problem, answering the question, or providing next steps to the consumer's satisfaction.

Other segmentation types may be used. Each segment may be processed in the same way as for an entire interaction. Thus, a final frustration level and score may be calculated for each segment of the call, in addition or instead of the final frustration level and score of the entire interaction.

The frustration trajectory may also be tracked across the consumer's entire journey that may include a plurality of different interactions with the contact center. Calculating frustration level and score for each of a plurality of interactions of a single customer in a single subject may reveal successful agents and strategies, identify the most successful communication channels for interactions, and significant deviations from a first resolution.

Understanding the trajectory of frustration at various levels over a plurality of interactions may reveal which agents or teams are most effective at de-escalation strategies including problem solving and effective empathizing. Understanding frustration levels in different parts of an interaction or in a series of interactions may indicate which agents or group require training and training subjects.

The frustration lifecycle in interactions may be correlated with additional insights and KPIs, in addition to the identified agent participant, allowing the user to perform root cause analysis and to identify successful de-escalators, e.g., agents that tend to reduce frustration levels as the interaction continues. Call centers may assign agents that reduce frustration levels in a large enough fraction of frustrated interactions a special skill, e.g., these agents may be identified as "handling frustration". Thus, frustrated interactions or clients may be directed to the agents that are identified as "handling frustration".

Embodiments of the method detecting frustration in an interaction were tested using a hand-labeled corpus of nearly 10,000 real-world chat and voice interactions. Each interaction was manually labeled as either "frustrated" or "non-frustrated". Performance tests were performed utilizing a stratified 10-fold cross-validation (a procedure used to estimate the skill of the method on new data) over the corpus of labelled interactions. The precision results and score threshold are summarized in Table 4:

TABLE 4

Test results for binomial logistic regression using 10-fold cross-validation.

| Frustration Detection Pipeline | Score Threshold | Frustration Precision |
|---|---|---|
| Binomial Logistic Regression | 0.5 | 0.82 |
| Binomial Logistic Regression | 0.6 | 0.88 |
| Binomial Logistic Regression with Feature Normalization | 0.6 | 0.93 |

Figure 8:
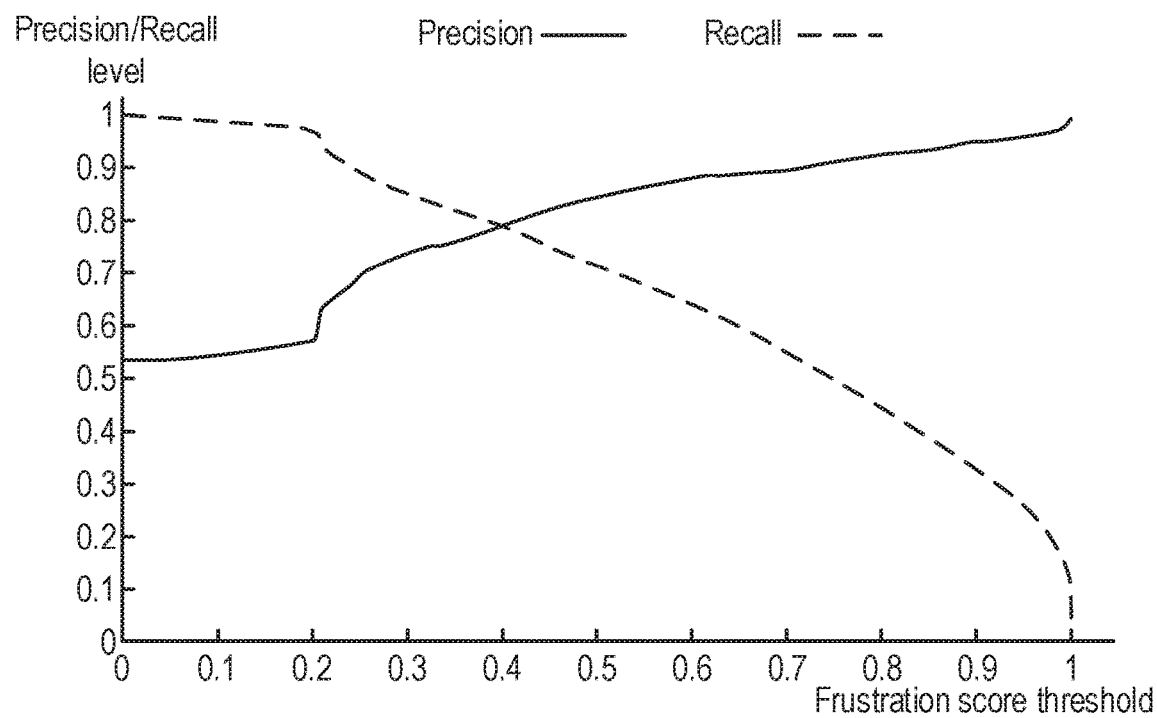
FIG. 8 depicts a precision/recall curve chart, according to embodiments of the present invention.

Additionally, the precision/recall curve chart depicted in FIG. 8 demonstrates how performance changes as the frustration score threshold changes. In this test a higher frustration score threshold was positively correlated with a higher overall precision across the dataset.

The frustration level, frustration score, and related metadata may pass downstream for use in the application. These metrics may be viewed at various levels and correlated with related KPIs in order to provide actionable information.

Figure 9:
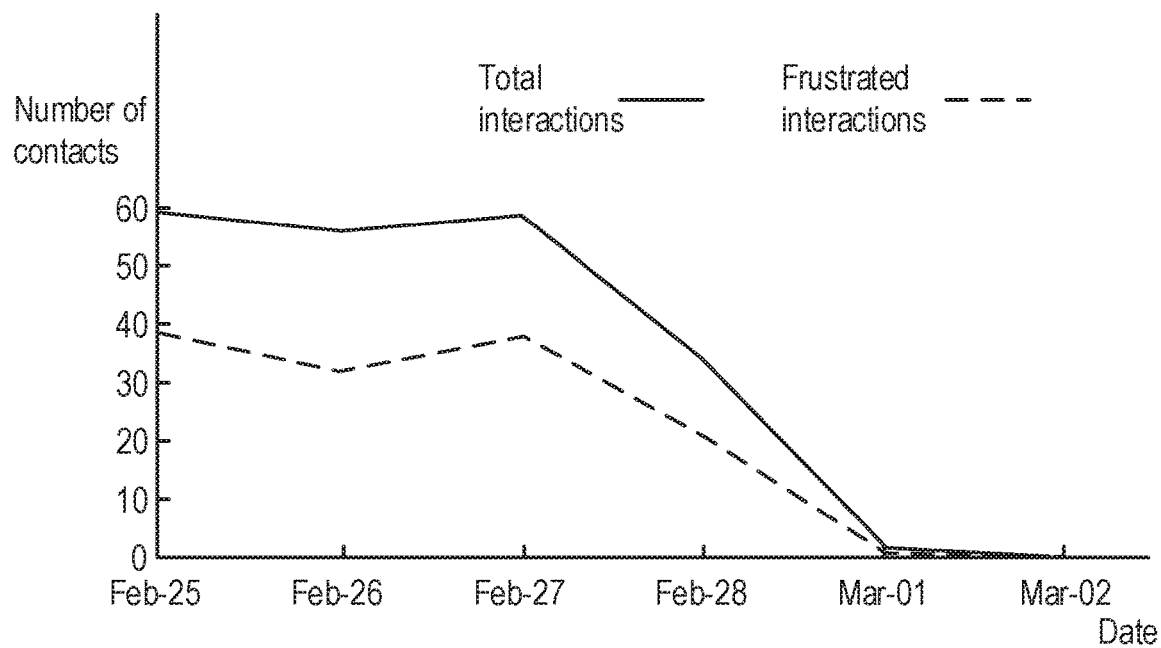
FIG. 9 depicts frustration trends versus time, according to embodiments of the present invention.

"Frustrated" and "non-frustrated" interactions may be presented, e.g., in a graphical user interface (GUI) side by side in aggregate, so as to provide frustration trends and surface a holistic view of the health of the contact center. The holistic view may also be visualized over time, or constrained by contact related metadata in the system, such as average call handling, silence detection, and other metrics. For example, FIG. 9 depicts frustration trends versus time, e.g., the average frustration score versus time. It can be seen that frustration levels gradually decrease from February 27 to May 1. Trends as presented in FIG. 9 may be provided for a single agent, a group of agents, etc.

Figure 10:
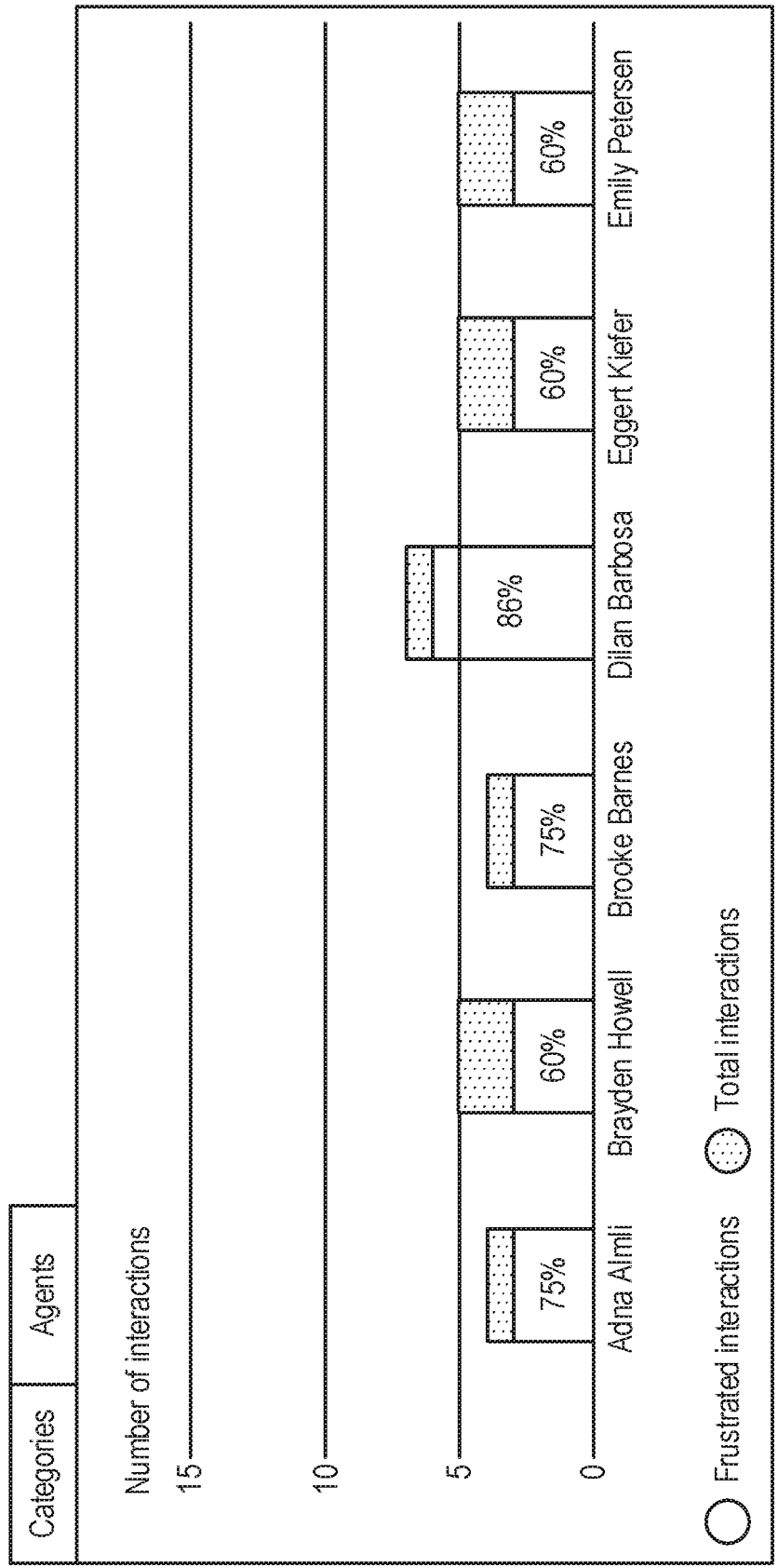
FIG. 10 depicts frustration levels versus categories, according to embodiments of the present invention.

The frustration score and level may be examined in correlation to specific categories or call center agents. Categories related to agent performance, contact purpose and more may be displayed relative to the presence of frustration in those interactions, as can be seen in FIG. 10. This enables users to understand which phenomena are exceeding general displeasure and reaching unacceptable levels of negativity. Similarly, identifying which agents are on the receiving end of the most frustrated interactions may enable performing corrective actions such as providing support and coaching.

Figure 11:
FIG. 11 depicts a screenshot of a drilldown into an interaction with high frustration level, according to embodiments of the present invention.

Detecting frustration levels may enable performing drill down analysis for interactions that include high levels of frustration. Drilling down may include reading or listening to the frustrated interaction in order to detect the reason for the high frustration level. Reviewing frustrated interaction may be performed more efficiently using the text offsets information which pinpoints to the places in the interaction in which frustration cues were found. FIG. 11 depicts a screenshot of a drilldown into an interaction with high frustration level. The frustration cues are highlighted in the interaction window.

Figure 12:
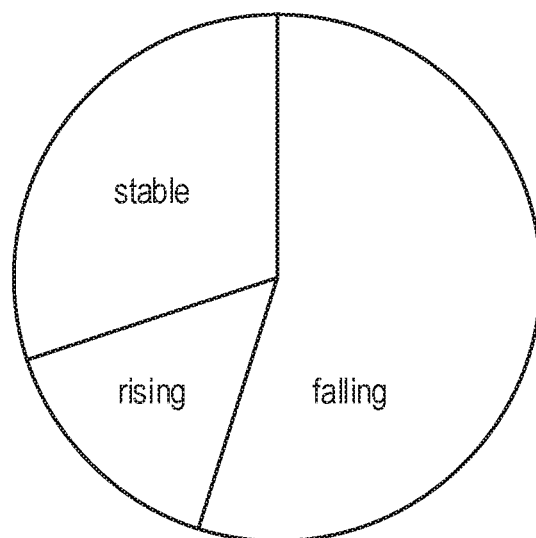
FIG. 12 depicts an end of call widget or display that indicates to the user whether interactions are successfully completed, according to embodiments of the present invention.

The level of frustration may be measured at specific segments or parts of the interaction as well as the holistic frustration level. FIG. 12 depicts an end of call widget or display that indicates to the user whether interactions are successfully completed, according to one embodiment. A frustration level that has fallen is indicative of a successful interaction, while an increase of frustration levels signals a failed interaction. A stable level may indicate an intractable problem.

Figure 13:
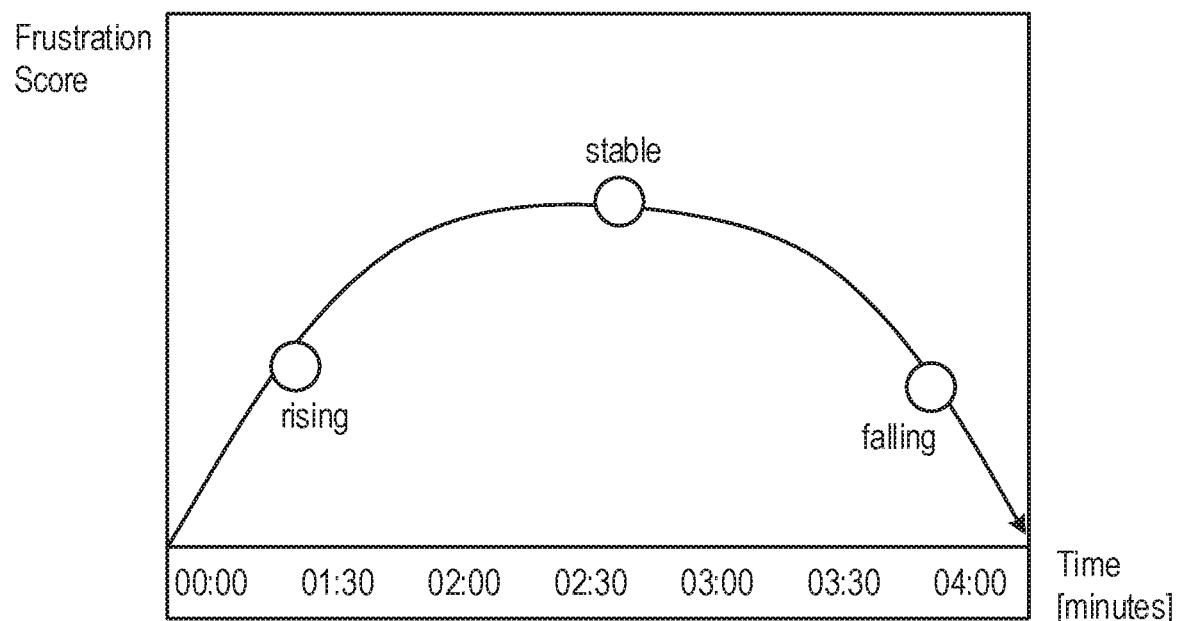
FIG. 13 depicts frustration lifecycle within a single interaction, according to embodiments of the present invention.

The user may select the frustration lifecycle metric for individual interactions so as to visualize how frustration is progressing during a single interaction, either by agent or consumer. This application of the metric across segments of the interaction allows users to compare frustration at the start of the interaction with changes to these levels over the course of the interaction, thus tracking the efficacy of the contact center agents and processes. FIG. 13 depicts frustration lifecycle within a single interaction.

Frustration may also be measured across time periods in order to provide information regarding changes in frustration scores or levels for agents. This may provide users with feedback regarding whether agent trainings are equipping them to better handle frustrated customers, or may measure the influence of specific seasons or events, such as holidays. Table 5 provides the change in the percent of frustrated interaction for three agents between July and August.

TABLE 5

Example change in the percent of frustrated interaction for three agents between July and August.

| Agent | July | August | Change in frustration score |
|---|---|---|---|
| Amir Rodriguez | 34.5% | 15% | −19.5% |
| Sally Sauerbrunn | 15% | 60% | +45% |
| Vero Smith | 75% | 74% | −1% |

Figure 14:
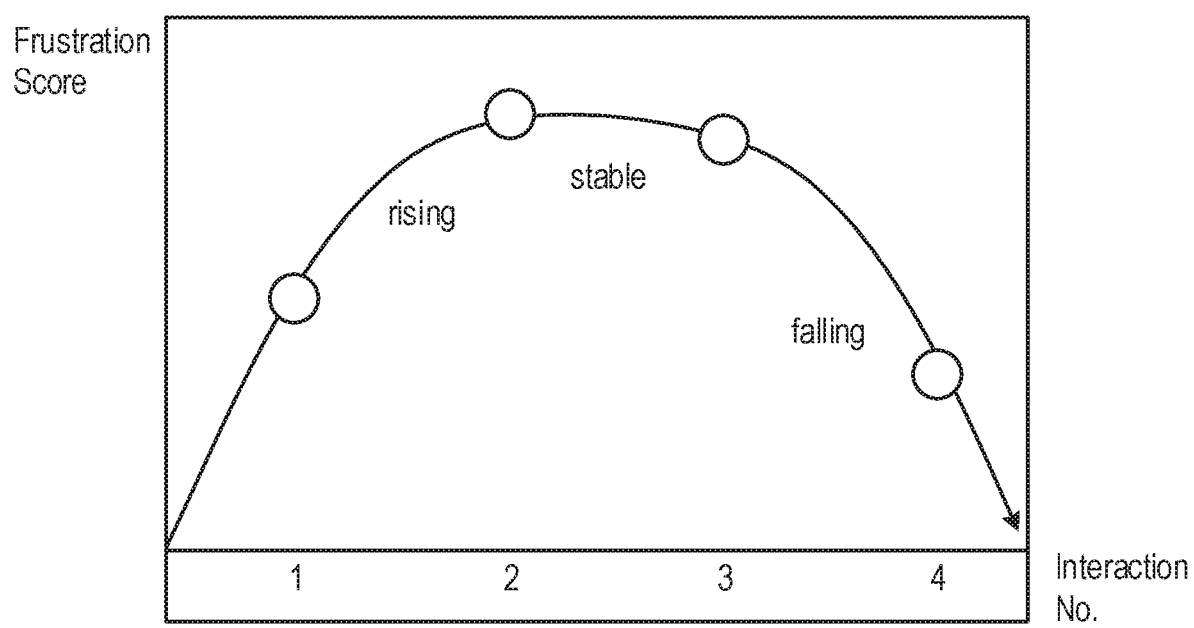
FIG. 14 depicts lifecycle arc across a customer journey that includes four interactions, according to embodiments of the present invention.

According to embodiments of the invention, frustration may be measured across a customer journey. A customer journey may include a plurality of interactions, whether in voice, chat, email, etc., of one or more agents with a single client regarding a single subject. For example, a customer journey frustration detection widget may present frustration scores across the plurality of interactions of a single journey. Frustration scores and levels may be presented chronologically or visualized according to agents or categories. In some embodiments, frustration lifecycle may be presented as a trajectory of frustration over the course of multiple interactions. The lifecycle may chart an arc of the frustration as it evolves from interaction to interaction. FIG. 14 depicts a lifecycle arc across a customer journey that includes four interactions. The arc may have several characteristics or purposes:

The arc may have a status of rising, stable or falling.

The arc may also be compared against an expected norm to calculate deviations.

The lifecycle arc may be reviewed at the level of an individual customer, customer service agent or team, or entire company.

The arc may reveal issues with a specific agent.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for automatically detecting frustration in an interaction, the method comprising:
identifying in the interaction, by a computer processor, using a set of linguistic rules, natural language patterns related to frustration, wherein the linguistic rules define weights associated with the natural language patterns and rule metadata;
reviewing, by the computer processor, the rule metadata associated with the identified natural language patterns to identify override attributes, wherein an override attribute is selected from a list consisting of: set interaction to frustrated, and set interaction to non-frustrated, wherein:
if the rule metadata does not include override attributes, then a frustration level in the interaction is determined, by the computer processor, based on the identified natural language patterns and weights associated with the identified natural language patterns;
if the rule metadata includes a set interaction to non-frustrated override attribute then the frustration level is determined to be non-frustrated,
if the rule metadata includes a set interaction to frustrated override attribute then the frustration level is determined to be frustrated, and otherwise the frustration level is determined based on the identified natural language patterns and the weights associated with the identified natural language patterns, and if the rule metadata includes override attributes then the frustration level is determined, by the computer processor, based on the identified override attributes.

2. The method of claim 1, comprising obtaining a transcription of the interaction, wherein identifying natural language patterns in the interaction comprises identifying linguistic rules matches in the transcription of the interaction.

3. The method of claim 2, comprising:
providing text offset information for each of the identified natural language patterns; and
highlighting the identified natural language patterns in the transcription of the interaction.

4. The method of claim 1, wherein determining the level of frustration in the interaction based on the identified natural language patterns and the weights associated with the identified natural language patterns comprises:
calculating a frustration score indicative of a probability that the interaction contains frustration using a classifier; and
determining that the interaction contains frustration if the frustration score exceeds a first threshold.

5. The method of claim 4, wherein determining whether the interaction contains frustration based on the identified natural language patterns and weights associated with the identified natural language patterns comprises: prior to calculating the frustration score, nulling all the weights associated with the identified natural language patterns only if a number of the natural language patterns is below a second threshold, and none of the identified rules include an override handling attribute to increase the frustration level.

6. The method of claim 4, wherein the classifier comprises one of:
a binomial logistic regression with sigmoid function; and
multinomial logistic regression algorithm with softmax function.

7. The method of claim 1, comprising generating the set of linguistic rules by:
obtaining a plurality of labeled interactions, wherein Ma a label indicates a known level of frustration in each of the labeled interactions;
obtaining identification of phrases associated with frustration that are present in the labeled interactions that are labeled as including frustration;
obtaining a linguistic rule for each of the identified phrases;
training a classifier to calculate a weight for each of the linguistic rules;
performing error analysis to evaluate performance of each linguistic rule;
adjusting the weights based on the error analysis; and
associating metadata to each linguistic rule.

8. The method of claim 1, wherein the rule metadata comprises at least one of:
a language of the associated linguistic rule;
a rule type, wherein the rule type includes at least one of: FRUSTRATION: for indicating a standard frustration rule, FRUSTRATION_A_PRIORI: an override attribute for indicating a rule requiring override handling, NEUTRALIZE: an override attribute for indicating a rule requiring override handling, NEGATION: a rule used by other frustration rules, that encodes environments for linguistic negation and INTENSIFIER: a rule used by other frustration rules, that encodes environments for linguistic boosting, rule group: for grouping morphologically and semantically related natural language patterns;
rule logic: the linguistic pattern expressing frustration, comprising at least one of: single tokens, phrases, token operators, proximity operators, and co-occurrence sets; and
rule behavior: special handling for contextual features including negation signifiers and intensifiers.

9. The method of claim 1, comprising:
dividing the interaction into segments; and
providing a frustration level for each segment.

10. A system for automatically detecting frustration in an interaction, the system comprising:
a memory;
a processor configured to:
identify in the interaction, using a set of linguistic rules, natural language patterns related to frustration, wherein the linguistic rules define weights associated with the natural language patterns and rule metadata;
review the rule metadata associated with the identified natural language patterns to identify override attributes, wherein an override attribute is selected from a list consisting of: set interaction to frustrated, and set interaction to non-frustrated, wherein:
if the rule metadata does not include override attributes, then a frustration level in the interaction is determined based on the identified natural language patterns and weights associated with the identified natural language patterns;
if the rule metadata includes a set interaction to non-frustrated override attribute then the processor is configured to determine the frustration level to be non-frustrated,
if the rule metadata includes a set interaction to frustrated override attribute then the processor is configured to determine the frustration level to be frustrated, and
otherwise the processor is configured to determine the frustration level based on the identified natural language patterns and the weights associated with the identified natural language patterns, and
if the rule metadata includes override attributes then the frustration level is determined based on the identified override attributes.

11. The system of claim 10, wherein the processor is configured to:
obtain a transcription of the interaction; and
identify natural language patterns in the interaction by identifying linguistic rules matches in the transcription of the interaction.

12. The system of claim 11, wherein the processor is configured to:
provide text offset information for each of the identified natural language patterns; and
highlight the identified natural language patterns in the transcription of the interaction.

13. The system of claim 10, wherein the processor is configured to determine the level of frustration in the interaction based on the identified natural language patterns and the weights associated with the identified natural language patterns by:
calculating a frustration score indicative of a probability that the interaction contains frustration using a classifier; and determining that the interaction contains frustration if the frustration score exceeds a first threshold.

14. The system of claim 13, wherein the processor is configured to determine whether the interaction contains frustration based on the identified natural language patterns and weights associated with the identified natural language patterns by:
    prior to calculating the frustration score, nulling all the weights associated with the identified natural language patterns only if a number of the natural language patterns is below a second threshold, and none of the identified rules include an override handling attribute to increase the frustration level.

15. The system of claim 13, wherein the classifier comprises one of:
    a binomial logistic regression with sigmoid function; and
    multinomial logistic regression algorithm with softmax function.

16. The system of claim 10, wherein the processor is configured to generate the set of linguistic rules by:
    obtaining a plurality of labeled interactions, wherein a label indicates a known level of frustration in each of the labeled interactions;
    obtaining identification of phrases associated with frustration that are present in the labeled interactions that are labeled as including frustration;
    obtaining a linguistic rule for each of the identified phrases;
    training a classifier to calculate a weight for each of the linguistic rules;
    performing error analysis to evaluate performance of each linguistic rule;
    adjusting the weights based on the error analysis; and
    associating metadata to each linguistic rule.

17. The system of claim 10, wherein the processor is configured to:
    divide the interaction into segments; and
    provide a frustration level for each segment.

18. A method for automatically detecting frustration in an interaction, the method comprising:
    identifying in the interaction, by a computer processor, using a set of linguistic rules, natural language patterns related to frustration, wherein the linguistic rules define weights associated with the natural language patterns and rule metadata;
    reviewing, by the computer processor, the rule metadata associated with the identified natural language patterns to identify override attributes, wherein if the rule metadata does not include override attributes, then a frustration level in the interaction is determined, by the computer processor, based on the identified natural language patterns and weights associated with the identified natural language patterns, wherein determining the level of frustration comprises:
        nulling all the weights associated with the identified natural language patterns only if a number of the natural language patterns is below a second threshold, and none of the identified rules include an override handling attribute to increase the frustration level;
        calculating a frustration score indicative of a probability that the interaction contains frustration using a classifier; and
        determining that the interaction contains frustration if the frustration score exceeds a first threshold; and
    if the rule metadata includes override attributes then the frustration level is determined, by the computer processor, based on the identified override attributes.

19. A method for automatically detecting frustration in an interaction, the method comprising:
    identifying in the interaction, by a computer processor, using a set of linguistic rules, natural language patterns related to frustration, wherein the linguistic rules define weights associated with the natural language patterns and rule metadata, comprising generating the set of linguistic rules by:
        obtaining a plurality of labeled interactions, wherein a label indicates a known level of frustration in each of the labeled interactions;
        obtaining identification of phrases associated with frustration that are present in the labeled interactions that are labeled as including frustration;
        obtaining a linguistic rule for each of the identified phrases;
        training a classifier to calculate a weight for each of the linguistic rules;
        performing error analysis to evaluate performance of each linguistic rule;
        adjusting the weights based on the error analysis; and
        associating metadata to each linguistic rule;
    reviewing, by the computer processor, the rule metadata associated with the identified natural language patterns to identify override attributes, wherein if the rule metadata does not include override attributes, then a frustration level in the interaction is determined, by the computer processor, based on the identified natural language patterns and weights associated with the identified natural language patterns; and
    if the rule metadata includes override attributes then the frustration level is determined, by the computer processor, based on the identified override attributes.

20. A system for automatically detecting frustration in an interaction, the system comprising:
    a memory;
    a processor configured to:
        identify in the interaction, using a set of linguistic rules, natural language patterns related to frustration, wherein the linguistic rules define weights associated with the natural language patterns and rule metadata;
        review the rule metadata associated with the identified natural language patterns to identify override attributes, wherein if the rule metadata does not include override attributes, then a frustration level in the interaction is determined based on the identified natural language patterns and weights associated with the identified natural language patterns, wherein the determining the level of frustration comprises:
            null all the weights associated with the identified natural language patterns only if a number of the natural language patterns is below a second threshold, and none of the identified rules include an override handling attribute to increase the frustration level;
            calculate a frustration score indicative of the probability that the interaction contains frustration using a classifier; and
            determine that the interaction contains frustration if the frustration score exceeds a first threshold; and
        if the rule metadata includes override attributes then the frustration level is determined based on the identified override attributes.

21. A system for automatically detecting frustration in an interaction, the system comprising:
a memory;
a processor configured to:
identify in the interaction, using a set of linguistic rules, natural language patterns related to frustration, wherein the linguistic rules define weights associated with the natural language patterns and rule metadata, comprising generating the set of linguistic rules by:
obtaining a plurality of labeled interactions, wherein a label indicates a known level of frustration in each of the labeled interactions;
obtaining identification of phrases associated with frustration that are present in the labeled interactions that are labeled as including frustration;
obtaining a linguistic rule for each of the identified phrases;
training a classifier to calculate a weight for each of the linguistic rules;
performing error analysis to evaluate performance of each linguistic rule;
adjusting the weights based on the error analysis; and
associating metadata to each linguistic rule;
review the rule metadata associated with the identified natural language patterns to identify override attributes, wherein if the rule metadata does not include override attributes, then a frustration level in the interaction is determined based on the identified natural language patterns and weights associated with the identified natural language patterns; and
if the rule metadata includes override attributes then the frustration level is determined based on the identified override attributes.

* * * * *